United States Patent
Sasaki et al.

(10) Patent No.: US 9,218,827 B1
(45) Date of Patent: Dec. 22, 2015

(54) THERMALLY-ASSISTED MAGNETIC RECORDING HEAD INCLUDING A RETURN PATH SECTION

(71) Applicants: Yoshitaka Sasaki, Santa Clara, CA (US); Kazuki Sato, Milpitas, CA (US); Hiroyuki Ito, Milpitas, CA (US); Hideo Mamiya, Milpitas, CA (US); Hironori Araki, Milpitas, CA (US); Yukinori Ikegawa, Milpitas, CA (US)

(72) Inventors: Yoshitaka Sasaki, Santa Clara, CA (US); Kazuki Sato, Milpitas, CA (US); Hiroyuki Ito, Milpitas, CA (US); Hideo Mamiya, Milpitas, CA (US); Hironori Araki, Milpitas, CA (US); Yukinori Ikegawa, Milpitas, CA (US)

(73) Assignee: HEADWAY TECHNOLOGIES, INC., Milpitas ( * ) Notice: Subject to any disclaimer, the term of this patent is extended or adjusted under 35 U.S.C. 154(b) by 0 days.

(21) Appl. No.: 14/335,528

(22) Filed: Jul. 18, 2014

(51) Int. Cl.
G11B 11/00 (2006.01)
G11B 5/17 (2006.01)
G11B 5/00 (2006.01)
G11B 11/24 (2006.01)

(52) U.S. Cl.
CPC . *G11B 5/17* (2013.01); *G11B 11/24* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,456,968 B1 * | 6/2013 | Sasaki et al. | G11B 5/3136 369/13.13 |
| 8,462,594 B1 | 6/2013 | Aoki et al. | |
| 8,482,879 B1 | 7/2013 | Sasaki et al. | |
| 8,493,821 B1 | 7/2013 | Sasaki et al. | |
| 8,498,183 B1 | 7/2013 | Sasaki et al. | |
| 8,564,905 B1 * | 10/2013 | Umehara et al. | G11B 5/1278 360/125.06 |
| 8,588,040 B1 * | 11/2013 | Fujita et al. | G11B 5/102 360/59 |
| 8,614,932 B1 | 12/2013 | Sasaki et al. | |
| 8,691,102 B1 * | 4/2014 | Araki et al. | G03F 7/00 216/41 |
| 8,711,663 B1 | 4/2014 | Sasaki et al. | |
| 8,760,809 B1 | 6/2014 | Sasaki et al. | |
| 8,923,100 B1 | 12/2014 | Wessel et al. | |
| 2007/0096854 A1 * | 5/2007 | Matsumoto | G11B 5/02 335/208 |
| 2009/0168220 A1 * | 7/2009 | Komura | G11B 5/314 360/59 |
| 2010/0103553 A1 * | 4/2010 | Shimazawa | B82Y 20/00 360/59 |
| 2010/0142079 A1 * | 6/2010 | Tanaka | G11B 5/314 360/59 |
| 2010/0165802 A1 * | 7/2010 | Stipe | G11B 5/314 369/13.13 |
| 2010/0259845 A1 * | 10/2010 | Miyauchi | G11B 5/3116 360/51 |
| 2010/0302672 A1 * | 12/2010 | Aoki | G11B 5/3116 360/59 |

(Continued)

OTHER PUBLICATIONS

Jul. 2, 2014 Office Action issued in U.S. Appl. No. 14/021,365.

(Continued)

*Primary Examiner* — Peter Vincent Agustin
(74) *Attorney, Agent, or Firm* — Oliff PLC

(57) ABSTRACT

A return path section includes a first yoke portion located on the front side in the direction of travel of a recording medium relative to a main pole and in contact with the top surface of the main pole. A coil includes a plurality of coil elements extending to pass between a core of a waveguide and the first yoke portion. The plurality of coil elements include a specific coil element. The main pole rides over the specific coil element.

11 Claims, 24 Drawing Sheets

(56) References Cited

U.S. PATENT DOCUMENTS

| | | | |
|---|---|---|---|
| 2010/0315736 A1* | 12/2010 | Takayama | G02B 6/1228 360/59 |
| 2011/0002199 A1 | 1/2011 | Takayama et al. | |
| 2011/0038236 A1* | 2/2011 | Mizuno | G11B 5/314 369/13.24 |
| 2011/0058272 A1 | 3/2011 | Miyauchi et al. | |
| 2011/0090587 A1* | 4/2011 | Chou | G11B 5/314 360/59 |
| 2011/0116349 A1 | 5/2011 | Komura et al. | |
| 2011/0170381 A1 | 7/2011 | Matsumoto | |
| 2011/0176398 A1 | 7/2011 | Tanaka et al. | |
| 2011/0222184 A1 | 9/2011 | Komura et al. | |
| 2011/0222190 A1* | 9/2011 | Hara | B82Y 20/00 360/234.6 |
| 2011/0242697 A1* | 10/2011 | Mori | G11B 5/314 360/59 |
| 2011/0292772 A1* | 12/2011 | Chou | G02B 6/107 369/13.33 |
| 2012/0275280 A1* | 11/2012 | Miyauchi et al. | G11B 5/3116 369/13.33 |
| 2012/0292287 A1* | 11/2012 | Araki et al. | G11B 5/3116 216/22 |
| 2012/0314323 A1* | 12/2012 | Sasaki et al. | 360/123.05 |
| 2013/0038966 A1 | 2/2013 | Sasaki et al. | |
| 2013/0215725 A1* | 8/2013 | Hirata et al. | G11B 5/3116 369/13.17 |
| 2013/0294208 A1 | 11/2013 | Peng et al. | |
| 2014/0241139 A1* | 8/2014 | Nishijima et al. | G11B 5/3133 369/13.33 |
| 2015/0043316 A1 | 2/2015 | Rea et al. | |

OTHER PUBLICATIONS

U.S. Appl. No. 14/209,262, in the name of Sasaki et al filed Mar. 13, 2014.

U.S. Appl. No. 14/475,090, in the name of Sasaki et al filed Jul. 18, 2014.

U.S. Appl. No. 14/021,365, in the name of Sasaki et al filed Sep. 9, 2013.

Jun. 30, 2015 Office Actin issued in U.S. Appl. No. 14/209,262.

Oct. 5, 2015 Notice of Allowance issued in U.S. Appl. No. 14/475,090.

* cited by examiner

THERMALLY-ASSISTED MAGNETIC RECORDING HEAD INCLUDING A RETURN PATH SECTION

BACKGROUND OF THE INVENTION

1. Field of the Invention

The present invention relates to a thermally-assisted magnetic recording head for use in thermally-assisted magnetic recording to write data on a recording medium with the coercivity thereof lowered by irradiating the recording medium with near-field light.

2. Description of the Related Art

Recently, magnetic recording devices such as magnetic disk drives have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a read head unit including a magnetoresistive element (hereinafter, also referred to as MR element) for reading and a write head unit including an induction-type electromagnetic transducer for writing are stacked on a substrate. In a magnetic disk drive, the thin-film magnetic head is mounted on a slider configured to slightly fly above the surface of a recording medium. The slider has a medium facing surface configured to face the recording medium. The medium facing surface has an air inflow end (a leading end) and an air outflow end (a trailing end).

Here, the side of the positions closer to the leading end relative to a reference position will be defined as the leading side, and the side of the positions closer to the trailing end relative to the reference position will be defined as the trailing side. The leading side is the rear side in the direction of travel of the recording medium relative to the slider. The trailing side is the front side in the direction of travel of the recording medium relative to the slider.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the recording medium, and this makes it difficult to perform data writing with existing magnetic heads.

To solve the foregoing problems, there has been proposed a technology so-called thermally-assisted magnetic recording. The technology uses a recording medium having high coercivity. When writing data, a write magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The laser light to be used for generating near-field light is typically guided through a waveguide, which is provided in the slider, to the plasmon generator disposed near the medium facing surface of the slider.

U.S. Patent Application Publication No. 2011/0058272 A1 and U.S. Pat. No. 8,614,932 B1 each disclose a technology in which the surface of the core of the waveguide and the surface of the plasmon generator are arranged to face each other with a gap therebetween, so that evanescent light that occurs from the surface of the core based on the light propagating through the core is used to excite surface plasmons on the plasmon generator to generate near-field light based on the excited surface plasmons.

A thermally-assisted magnetic recording head that employs a plasmon generator as a source of generation of near-field light is configured so that the write head unit includes a coil, a main pole and the plasmon generator. The coil is configured to produce a magnetic field corresponding to data to be written on a recording medium. The main pole has an end face located in the medium facing surface. The main pole is configured to allow a magnetic flux corresponding to the magnetic field produced by the coil to pass, and configured to produce a write magnetic field from the aforementioned end face. The plasmon generator includes a near-field light generating part located in the medium facing surface. It is required of the thermally-assisted magnetic recording head that the end face of the main pole and the near-field light generating part of the plasmon generator be located in close proximity to each other.

To increase the linear recording density of magnetic recording devices, it is effective to use a perpendicular magnetic recording system in which the direction of magnetization of signals to be written on tracks of a recording medium is perpendicular to the plane of the recording medium, and it is also effective to increase, on the tracks, the gradient of the change in write magnetic field intensity with respect to the change in position along the direction in which the tracks extend or the direction along the tracks (this gradient will hereinafter be referred to as the write field intensity gradient). The same holds true for a magnetic recording device that employs thermally-assisted magnetic recording.

In order to increase the write field intensity gradient in a magnetic head of the perpendicular magnetic recording system, it is effective to provide a shield that has an end face located in the medium facing surface at a position near the end face of the main pole. U.S. Patent Application Publication No. 2011/0058272 A1 and U.S. Pat. No. 8,614,392 B1 each disclose a technology for increasing the write field intensity gradient by providing such a shield on the leading side of the main pole.

A magnetic head including a shield is typically provided with a return path section for connecting the shield to a portion of the main pole located away from the medium facing surface. One or more spaces are defined between the return path section and the main pole. The coil is provided to pass through the one or more spaces.

Thermally-assisted magnetic recording heads are being often used in high-end, large-capacity magnetic disk drives typified by those for cloud computing business. Highly reliable thermally-assisted magnetic recording heads applicable to high-end, large-capacity magnetic disk drives are thus in demand.

However, thermally-assisted magnetic recording heads suffer from the problem that heat generated by the plasmon generator causes the plasmon generator to shrink and become distant from the medium facing surface, and causes corrosion of the main pole, thus reducing the life of the thermally-assisted magnetic recording head.

One of solutions to this problem is to reduce the amount of heat to be generated by the plasmon generator by reducing the laser light power, and at the same time, improve the signal-to-noise ratio (hereinafter referred to as S/N) of the write head unit in order to make up for the performance reduction of the write head unit caused by the reduction in the amount of heat generated by the plasmon generator. A well-known method for improving S/N of the write head unit is to increase the number of coil turns in the write head unit. Conventionally, however, an increase in the number of coil turns has resulted in an increase in the length of the magnetic path including the main pole and the return path section, thus giving rise to problems such as sluggish rise of the write current flowing through the coil and a reduction in the write current in a high frequency region.

OBJECT AND SUMMARY OF THE INVENTION

It is an object of the present invention to provide a thermally-assisted magnetic recording head that makes it possible to increase the number of coil turns without increasing the length of the magnetic path including the main pole and the return path section, and is consequently capable of achieving improved performance.

A thermally-assisted magnetic recording head of the present invention includes: a medium facing surface configured to face a recording medium; a coil configured to produce a magnetic field corresponding to data to be written on the recording medium; a main pole; a return path section formed of a magnetic material; a waveguide; and a plasmon generator. The main pole has a first end face located in the medium facing surface. The main pole is configured to allow a magnetic flux corresponding to the magnetic field produced by the coil to pass, and configured to produce a write magnetic field for writing data on the recording medium. The return path section has a second end face located in the medium facing surface. The return path section is connected to the main pole, and configured to allow a magnetic flux corresponding to the magnetic field produced by the coil to pass. The waveguide includes: a core which has a front end face facing toward the medium facing surface and is configured to allow light to propagate therethrough; and a cladding provided around the core. The plasmon generator includes a near-field light generating part located in the medium facing surface.

The second end face is located on the rear side in the direction of travel of the recording medium relative to the first end face. The near-field light generating part is located between the first end face and the second end face. The main pole is located on the front side in the direction of travel of the recording medium relative to the core. The plasmon generator is configured so that a surface plasmon is excited on the plasmon generator based on the light propagating through the core, and the near-field light generating part generates near-field light based on the surface plasmon.

The main pole further has a top surface which is a surface lying at a front-side end of the main pole in the direction of travel of the recording medium. The return path section includes a first yoke portion located on the front side in the direction of travel of the recording medium relative to the main pole and in contact with the top surface of the main pole. The coil includes a plurality of coil elements extending to pass between the core and the first yoke portion. The plurality of coil elements include a specific coil element. In a cross section that intersects the first end face of the main pole and is perpendicular to the medium facing surface and parallel to the direction of travel of the recording medium, the specific coil element has a bottom end portion lying at a rear-side end of the specific coil element in the direction of travel of the recording medium, a top end portion lying at a front-side end of the specific coil element in the direction of travel of the recording medium, a front end portion closest to the medium facing surface, and a rear end portion farthest from the medium facing surface.

The main pole includes: a first portion lying between a first imaginary plane and a second imaginary plane which are perpendicular to the direction of travel of the recording medium, the first portion being closer to the medium facing surface than is the specific coil element; and a second portion lying between a third imaginary plane and a fourth imaginary plane which are parallel to the medium facing surface, the second portion being located on the front side in the direction of travel of the recording medium relative to the specific coil element. The first imaginary plane passes through the bottom end portion of the specific coil element. The second imaginary plane passes through the top end portion of the specific coil element. The third imaginary plane passes through the front end portion of the specific coil element. The fourth imaginary plane passes through the rear end portion of the specific coil element.

In the thermally-assisted magnetic recording head of the present invention, the core may have an evanescent light generating surface configured to generate evanescent light based on the light propagating through the core, and the plasmon generator may include a plasmon exciting part located at a predetermined distance from the evanescent light generating surface and facing the evanescent light generating surface. In this case, the plasmon generator is configured so that a surface plasmon is excited on the plasmon exciting part through coupling with the evanescent light generated by the evanescent light generating surface, the surface plasmon propagates to the near-field light generating part, and the near-field light generating part generates near-field light based on the surface plasmon.

In the thermally-assisted magnetic recording head of the present invention, the first and second portions of the main pole may be formed of a single layer.

In the thermally-assisted magnetic recording head of the present invention, the specific coil element may have a first inclined surface facing toward the medium facing surface. The distance from the medium facing surface to an arbitrary point on the first inclined surface decreases with decreasing distance from the arbitrary point to the first imaginary plane. In this case, the main pole may have a second inclined surface opposed to the first inclined surface.

In the thermally-assisted magnetic recording head of the present invention, the front end face of the core may be located between the first end face and the second end face in the direction of travel of the recording medium.

In the thermally-assisted magnetic recording head of the present invention, the return path section may further include a shield including the second end face, and a connecting part connecting the shield and the first yoke portion to each other. In this case, the connecting part may include a second yoke portion, a first columnar portion, a second columnar portion, and a third columnar portion. The second yoke portion and the first columnar portion are located on the front side in the direction of travel of the recording medium relative to the core. The first columnar portion is located away from the medium facing surface and has a first end and a second end opposite to each other in the direction of travel of the recording medium. The second and third columnar portions are located closer to the medium facing surface than is the first columnar portion. The first yoke portion connects the main pole to the first end of the first columnar portion. The second columnar portion and the third columnar portion are located on opposite sides of the plasmon generator in the track width direction and connected to the shield. The second yoke portion is connected to the second end of the first columnar portion, and connected to the shield via the second and third columnar portions. The coil is wound around the first columnar portion.

Where the return path section includes the shield and the connecting part, the front end face of the core may have a first edge lying at a front-side end of the front end face in the direction of travel of the recording medium, and a second edge lying at a rear-side end of the front end face in the direction of travel of the recording medium. The first edge is located closer to the near-field light generating part than is the second edge. When the front end face of the core is divided into two regions: a first region extending from the midpoint position between the first edge and the second edge to the first edge; and a second region extending from the midpoint position to the second edge, the shield may overlap only the first region of the front end face when viewed in a direction perpendicular to the medium facing surface.

The shield may include at least one non-overlapping portion located on an outward side of the front end face of the core in the track width direction when viewed in the direction perpendicular to the medium facing surface. In this case, the connecting part is connected to the at least one non-overlapping portion. The at least one non-overlapping portion may be two non-overlapping portions that are located on opposite sides of the front end face of the core in the track width direction when viewed in the direction perpendicular to the medium facing surface.

Where the shield overlaps only the first region of the front end face of the core when viewed in the direction perpendicular to the medium facing surface, the first end face and the second end face may be at a distance of 50 to 300 nm from each other.

The thermally-assisted magnetic recording head of the present invention makes it possible to increase the number of turns of the coil without increasing the length of the magnetic path including the main pole and the return path section, and is consequently capable of achieving improved performance.

Other and further objects, features and advantages of the present invention will appear more fully from the following description.

DETAILED DESCRIPTION OF THE PREFERRED EMBODIMENTS

First Embodiment

Figure 1:
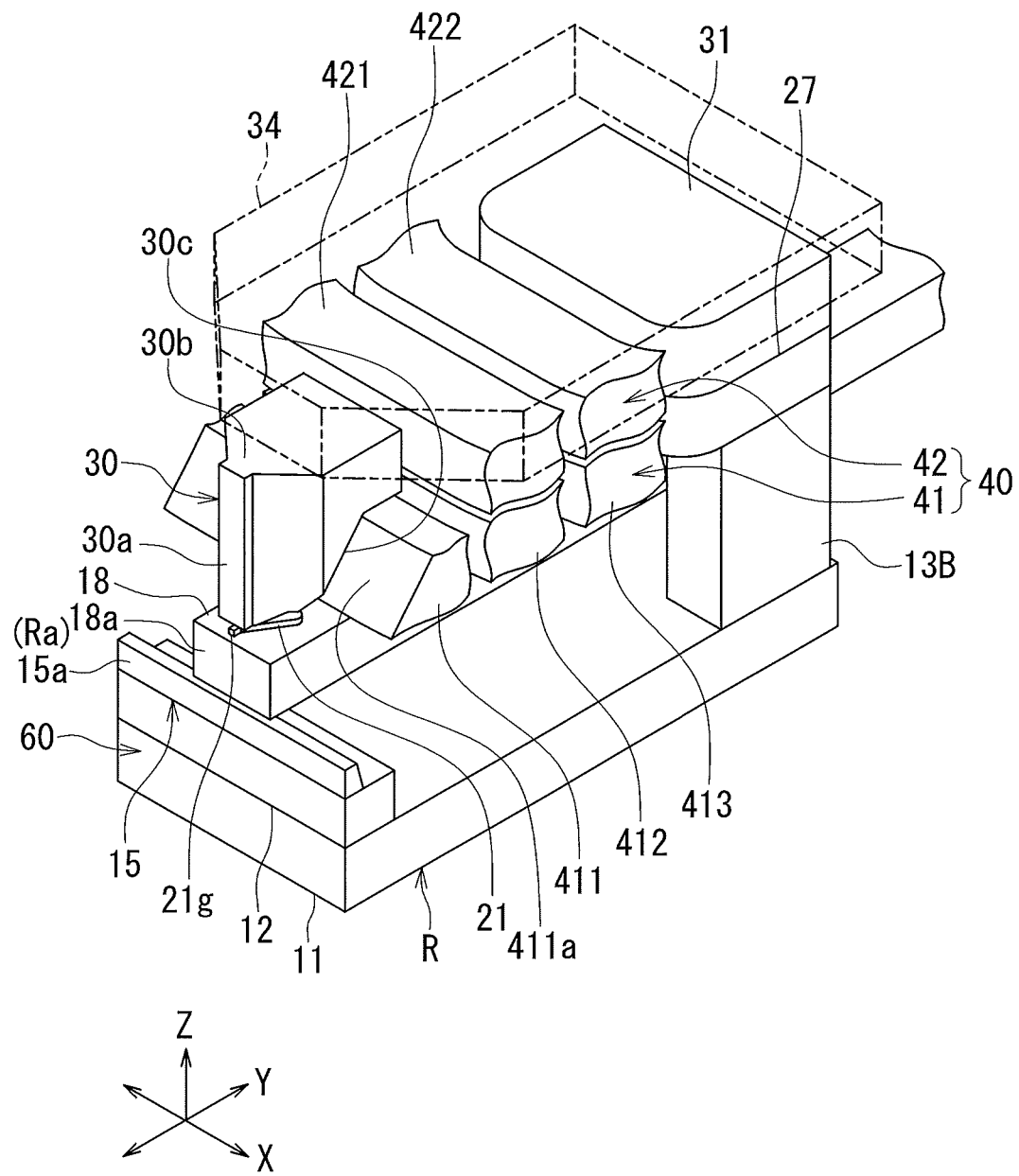
FIG. 1 is a perspective view showing the main part of a thermally-assisted magnetic recording head according to a first embodiment of the invention.
Figure 2:
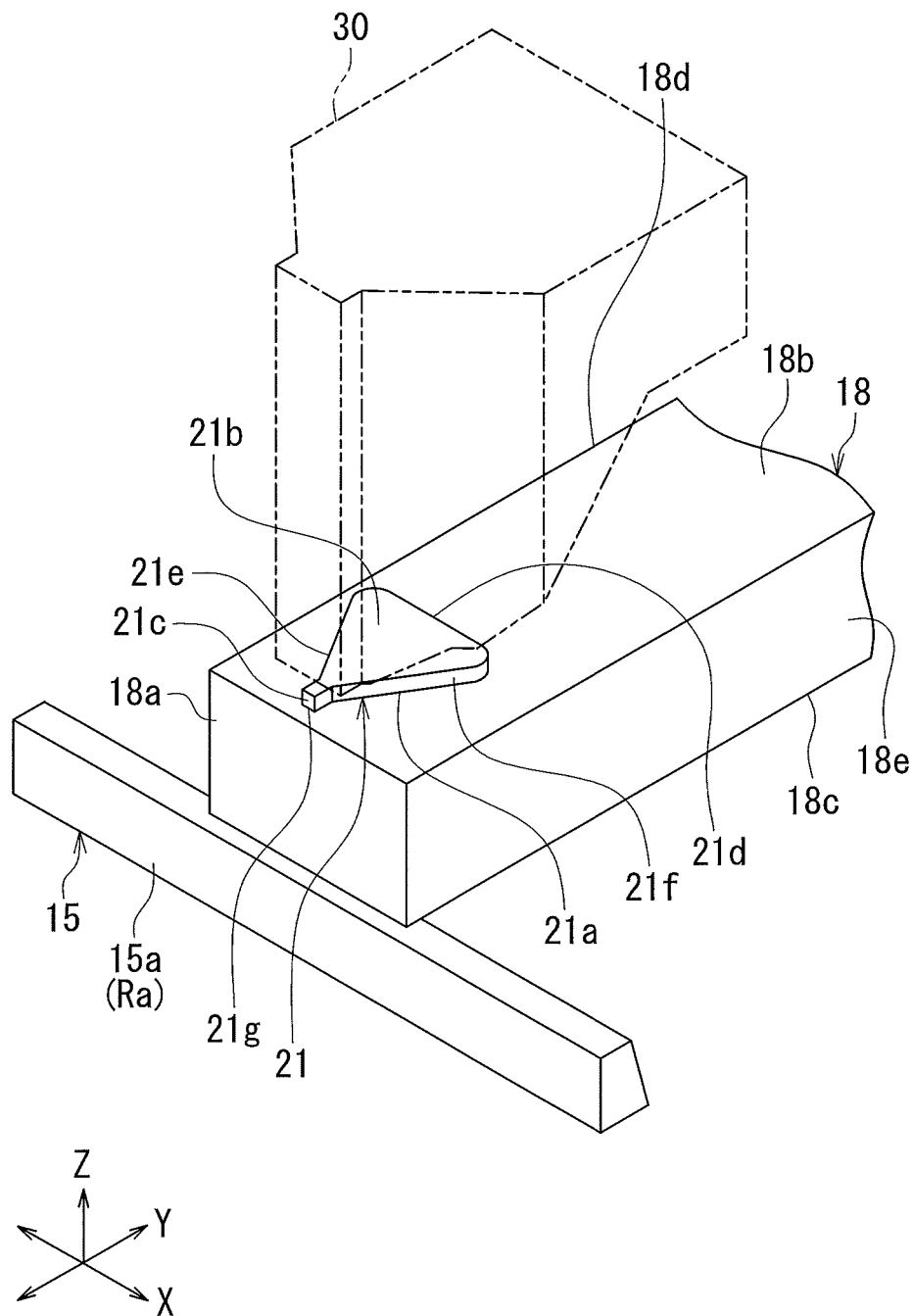
FIG. 2 is an enlarged perspective view of a part of FIG. 1.
Figure 3:
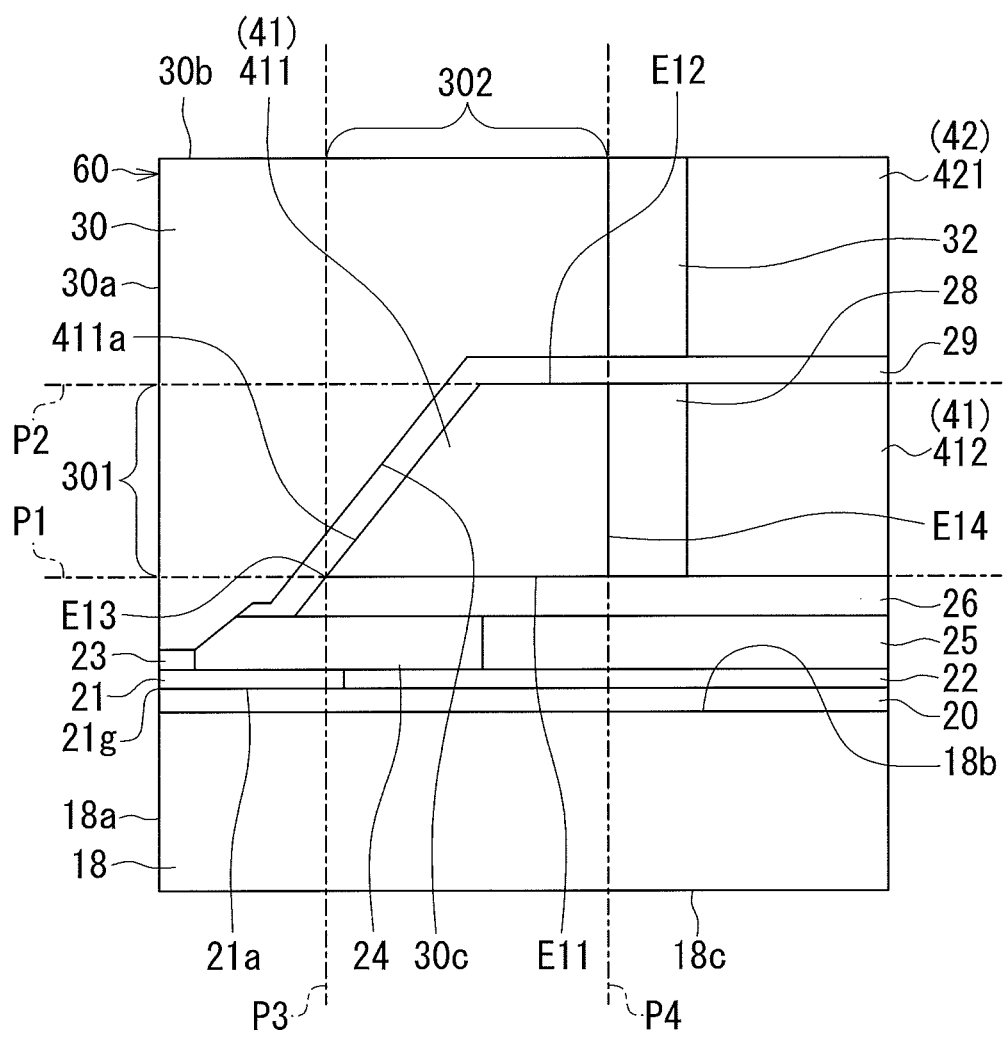
FIG. 3 is a cross-sectional view showing the main part of the thermally-assisted magnetic recording head according to the first embodiment of the invention.
Figure 4:
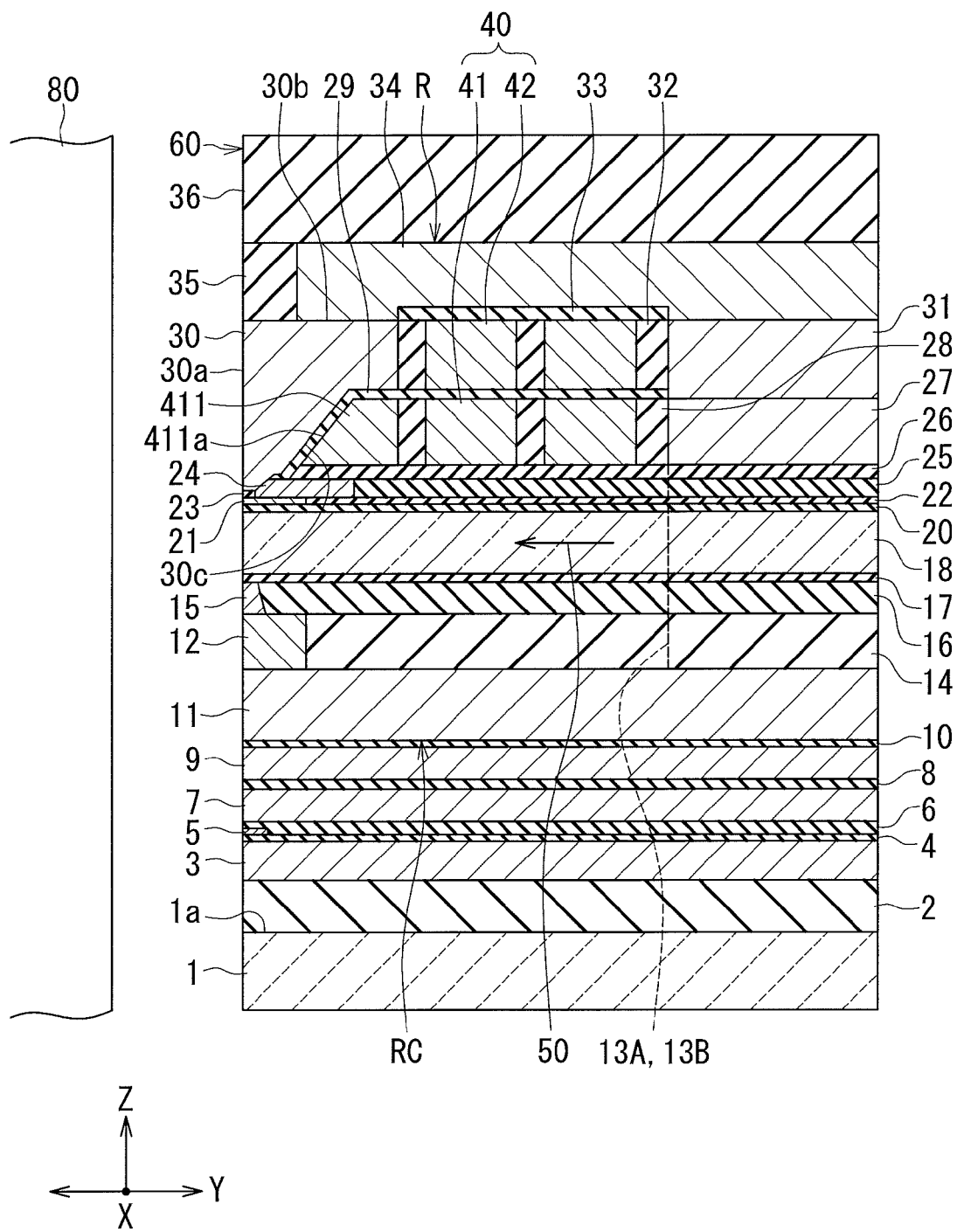
FIG. 4 is a cross-sectional view showing the configuration of the thermally-assisted magnetic recording head according to the first embodiment of the invention.
Figure 5:
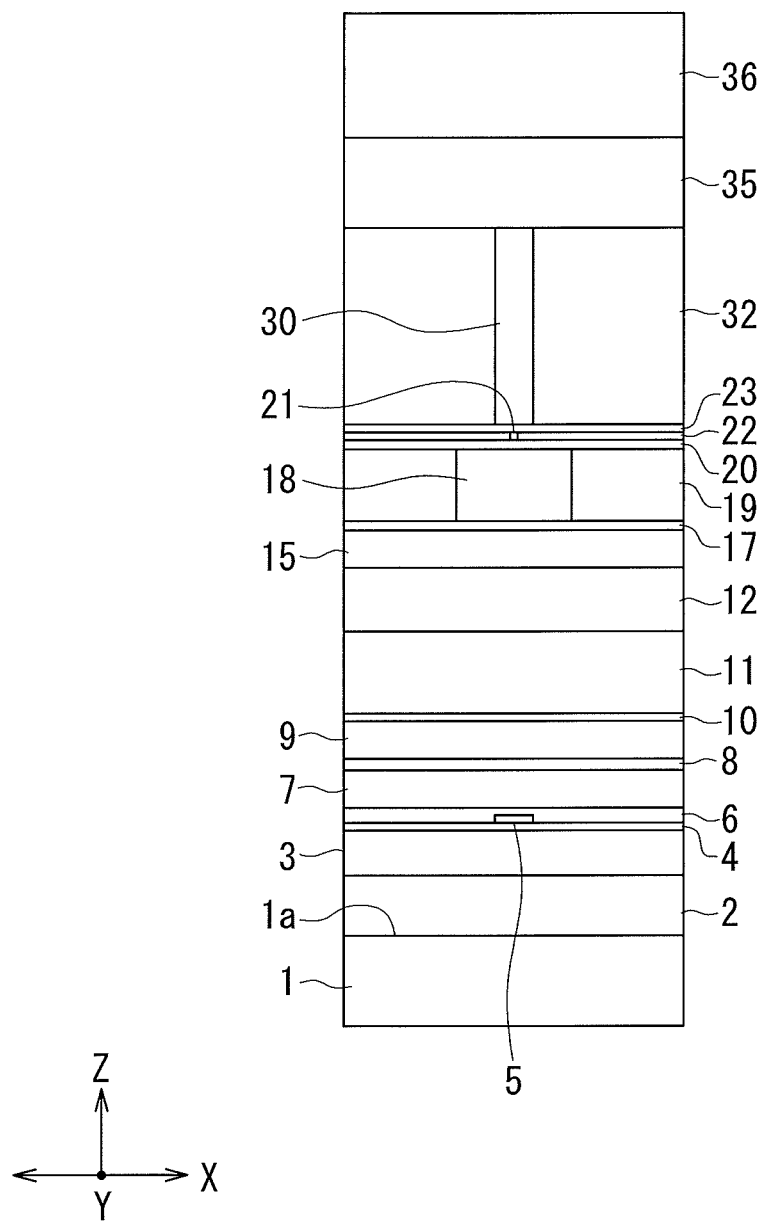
FIG. 5 is a front view showing the medium facing surface of the thermally-assisted magnetic recording head according to the first embodiment of the invention.
Figure 6:
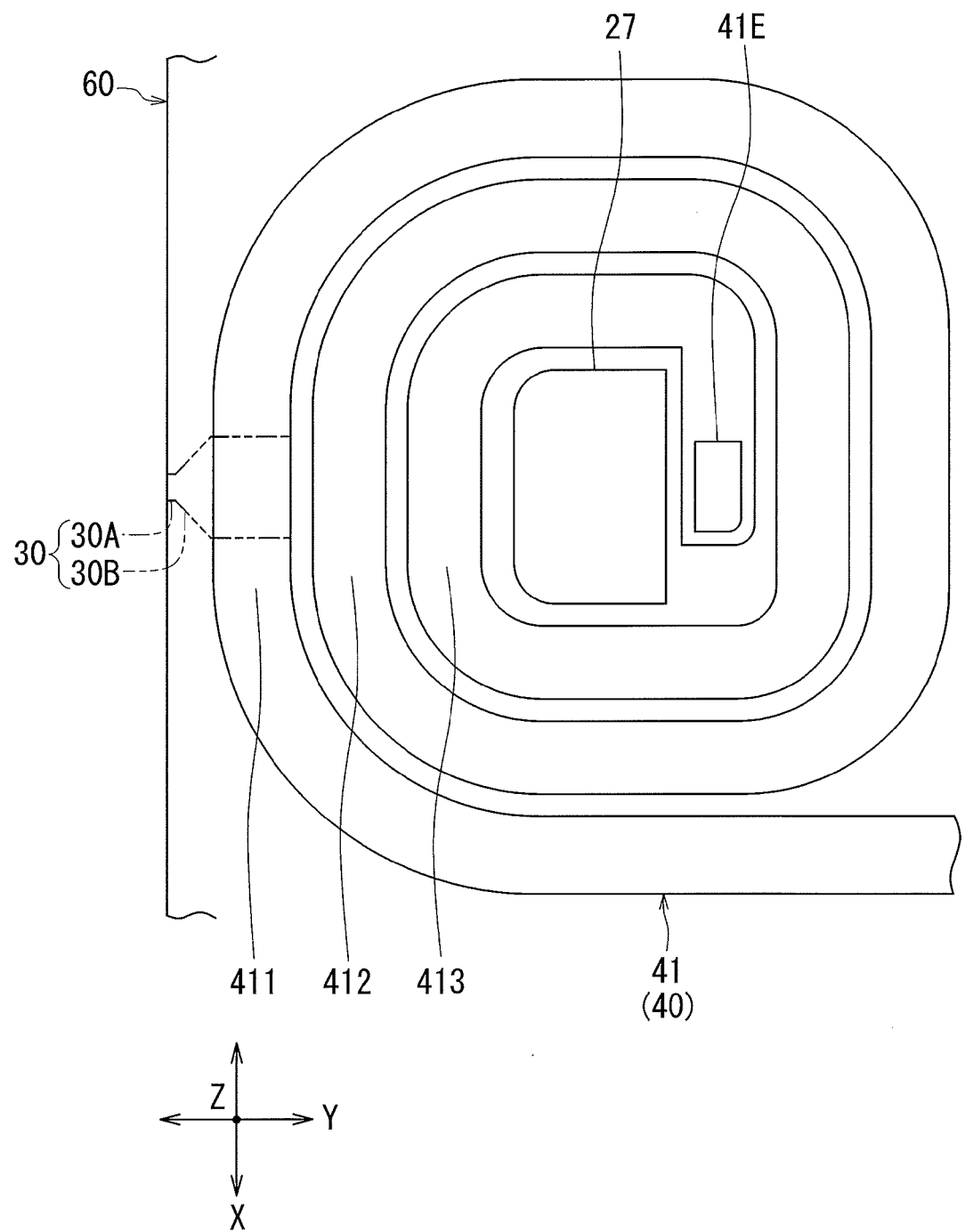
FIG. 6 is a plan view showing a first layer of a coil of the first embodiment of the invention.
Figure 7:
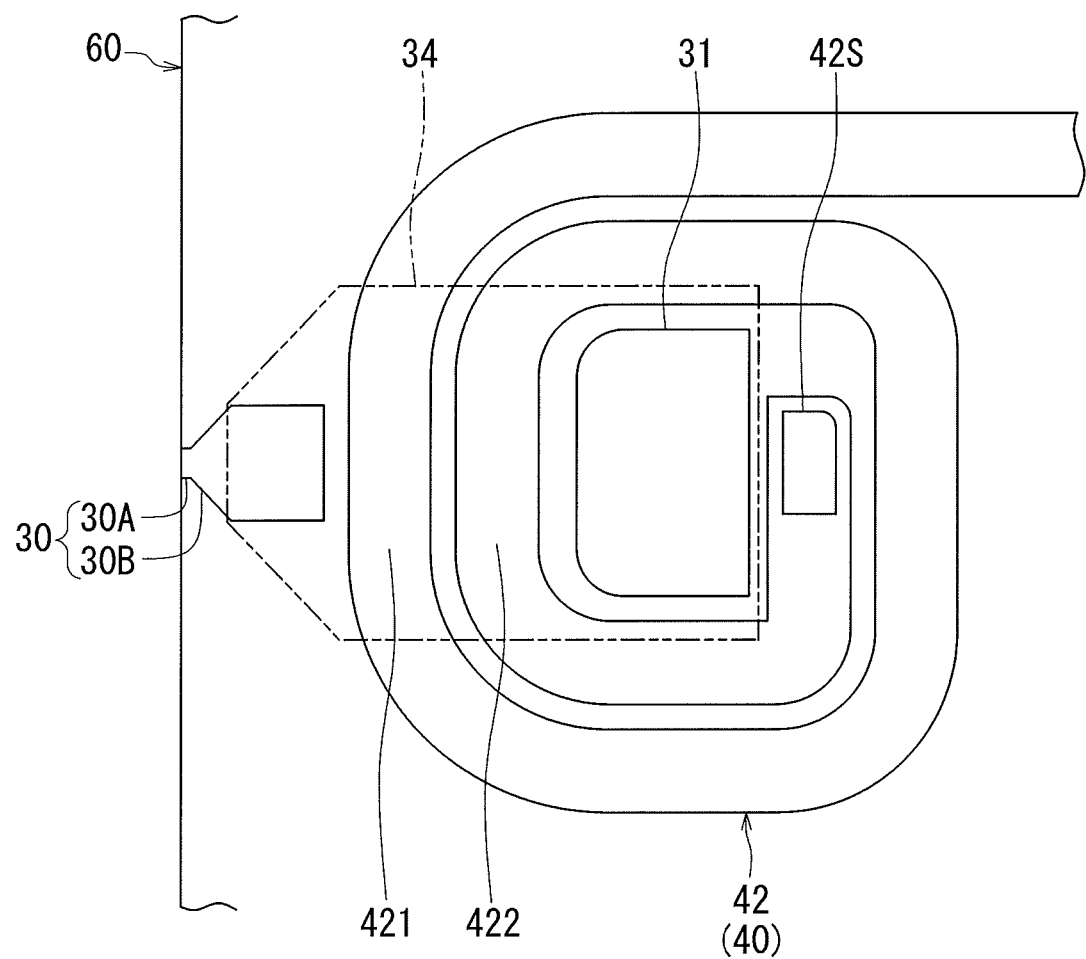
FIG. 7 is a plan view showing a second layer of the coil of the first embodiment of the invention.

Preferred embodiments of the present invention will now be described in detail with reference to the drawings. First, reference is made to FIG. 1 to FIG. 7 to describe the configuration of a thermally-assisted magnetic recording head according to a first embodiment of the invention. FIG. 1 is a perspective view showing the main part of the thermally-assisted magnetic recording head. FIG. 2 is an enlarged perspective view of a part of FIG. 1. FIG. 3 is a cross-sectional view showing the main part of the thermally-assisted magnetic recording head. FIG. 4 is a cross-sectional view showing the configuration of the thermally-assisted magnetic recording head. FIG. 5 is a front view showing the medium facing surface of the thermally-assisted magnetic recording head. FIG. 6 is a plan view showing a first layer of a coil of the present embodiment. FIG. 7 is a plan view showing a second layer of the coil of the present embodiment.

The thermally-assisted magnetic recording head according to the present embodiment is for use in perpendicular magnetic recording, and is in the form of a slider configured to fly over the surface of a rotating recording medium. When the recording medium rotates, an airflow passing between the recording medium and the slider causes a lift to be exerted on the slider. The slider is configured to fly over the surface of the recording medium by means of the lift.

As shown in FIG. 4, the thermally-assisted magnetic recording head has a medium facing surface 60 facing a recording medium 80. Here, X direction, Y direction, and Z direction will be defined as follows. The X direction is the direction across the tracks of the recording medium 80, i.e., the track width direction. The Y direction is a direction perpendicular to the medium facing surface 60. The Z direction is the direction of travel of the recording medium 80 as viewed from the slider. The X, Y, and Z directions are orthogonal to one another.

As shown in FIG. 4 and FIG. 5, the thermally-assisted magnetic recording head includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a bottom shield layer 3 formed of a magnetic material and disposed on the insulating layer 2; a bottom shield gap film 4 which is an insulating film disposed to cover the bottom shield layer 3; a magnetoresistive (MR) element 5 serving as a read element disposed on the bottom shield gap film 4; two leads (not illustrated) connected to the MR element 5; a top shield gap film 6 which is an insulating film disposed on the MR element 5; and a top shield layer 7 formed of a magnetic material and disposed on the top shield gap film 6. The Z direction is also a direction perpendicular to the top surface 1a of the substrate 1.

An end of the MR element 5 is located in the medium facing surface 60. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the plane of layers constituting the GMR element or the current-perpendicular-to-plane (CPP) type in which the current used for detecting magnetic signals is fed in a direction generally perpendicular to the plane of layers constituting the GMR element.

The parts from the bottom shield layer 3 to the top shield layer 7 constitute a read head unit. The thermally-assisted magnetic recording head further includes an insulating layer 8 disposed on the top shield layer 7, a middle shield layer 9 formed of a magnetic material and disposed on the insulating layer 8, a nonmagnetic layer 10 formed of a nonmagnetic material and disposed on the middle shield layer 9, and a write head unit disposed on the nonmagnetic layer 10. The middle shield layer 9 has the function of shielding the MR element 5 from magnetic fields generated in the write head unit. The insulating layer 8 and the nonmagnetic layer 10 are formed of alumina, for example.

The write head unit includes a coil 40, a main pole 30, and a return path section R formed of a magnetic material. The coil 40 is configured to produce a magnetic field corresponding to data to be written on the recording medium 80. The main pole 30 has a first end face 30a located in the medium facing surface 60. The main pole 30 is configured to allow a magnetic flux corresponding to the magnetic field produced by the coil 40 to pass, and configured to produce a write magnetic field for writing data on the recording medium 80 by means of a perpendicular magnetic recording system. The return path section R has a second end face Ra (see FIG. 1 and FIG. 2) located in the medium facing surface 60. The return path section R is connected to the main pole 30, and configured to allow a magnetic flux corresponding to the magnetic field produced by the coil 40 to pass. The coil 40 is formed of a conductive material such as copper.

The return path section R includes a first yoke portion 34, a shield 15, and a connecting part RC (see FIG. 4) connecting the shield 15 and the first yoke portion 34 to each other. The connecting part RC includes a return pole layer 11, coupling layers 12, 27 and 31, and two coupling portions 13A and 13B. The return pole layer 11 is disposed on the nonmagnetic layer 10. The return pole layer 11 has an end face located in the medium facing surface 60. The write head unit further includes a non-illustrated insulating layer disposed around the return pole layer 11. The non-illustrated insulating layer is formed of alumina, for example.

The coupling layer 12 is disposed on a first portion of the top surface of the return pole layer 11, the first portion being near the medium facing surface 60. The two coupling portions 13A and 13B are located on two second portions of the top surface of the return pole layer 11, the two second portions being located away from the medium facing surface 60. The coupling layer 12 has an end face located in the medium facing surface 60. Each of the coupling portions 13A and 13B includes a first layer lying on the return pole layer 11, and a second, a third and a fourth layer arranged in this order on the first layer. The first layer of the coupling portion 13A and the first layer of the coupling portion 13B are disposed to be adjacent in the track width direction (the X direction).

The write head unit further includes an insulating layer 14 lying on the non-illustrated insulating layer and a portion of the top surface of the return pole layer 11 other than the first and second portions. The first layers of the coupling portions 13A and 13B are embedded in the insulating layer 14. The insulating layer 14 is formed of alumina, for example.

The shield 15 is located near the medium facing surface 60 and lies on a portion of the top surface of the coupling layer 12 near the medium facing surface 60. As shown in FIG. 1 and FIG. 2, the shield 15 has an end face 15a located in the medium facing surface 60. In the present embodiment, in particular, the end face 15a of the shield 15 also serves as the second end face Ra of the return path section R. In other words, the shield 15 includes the second end face Ra.

The write head unit further includes an insulating layer 16 lying on the insulating layer 14 and the top surface of the coupling layer 12 excluding the aforementioned portion. The second layers of the coupling portions 13A and 13B are embedded in the insulating layer 16. The insulating layer 16 is formed of alumina, for example.

The write head unit further includes a waveguide, the waveguide including a core 18 configured to allow light to propagate therethrough, and a cladding provided around the core 18. As shown in FIG. 2 in particular, the core 18 has a front end face 18a facing toward the medium facing surface 60, an evanescent light generating surface 18b which is a top surface, a bottom surface 18c, and two side surfaces 18d and 18e. The front end face 18a may be located in the medium facing surface 60 or at a distance from the medium facing surface 60. FIG. 1 to FIG. 5 show an example in which the front end face 18a is located in the medium facing surface 60.

The cladding includes cladding layers 17, 19 and 20. The cladding layer 17 lies on the shield 15 and the insulating layer 16. The core 18 lies on the cladding layer 17. The cladding layer 19 lies on the cladding layer 17 and surrounds the core 18. The cladding layer 20 is disposed over the evanescent light generating surface 18b of the core 18 and the top surface of the cladding layer 19.

The core 18 is formed of a dielectric material that transmits laser light to be used for generating near-field light. The laser light emitted from a non-illustrated laser diode enters the core 18 and propagates through the core 18. The cladding layers 17, 19 and 20 are each formed of a dielectric material that has a refractive index lower than that of the core 18. For example, the core 18 may be formed of tantalum oxide such as $Ta_2O_5$ or silicon oxynitride (SiON), whereas the cladding layers 17, 19 and 20 may be formed of silicon dioxide ($SiO_2$) or alumina.

The third layers of the coupling portions 13A and 13B are embedded in the cladding layers 17 and 19. The third layer of the coupling portion 13A and the third layer of the coupling portion 13B are located on opposite sides of the core 18 in the track width direction (the X direction) and spaced from the core 18.

The write head unit further includes a plasmon generator 21 lying on the cladding layer 20 so as to be positioned above the evanescent light generating surface 18b of the core 18 in the vicinity of the medium facing surface 60, and a dielectric layer 22 lying on the cladding layer 20 and surrounding the plasmon generator 21. The plasmon generator 21 is configured to excite surface plasmons on the principle to be described later. The plasmon generator 21 is formed of, for example, one of Au, Ag, Al, Cu, Pd, Pt, Rh and Ir, or an alloy composed of two or more of these elements. The dielectric layer 22 is formed of the same material as the cladding layers 17, 19 and 20, for example. The shape of the plasmon generator 21 will be described in detail later.

The write head unit further includes an insulating layer 23 located near the medium facing surface 60 and lying on a portion of the plasmon generator 21 and a portion of the dielectric layer 22, and a nonmagnetic metal layer 24 lying on another portion of the plasmon generator 21 and another portion of the dielectric layer 22. The nonmagnetic metal layer 24 has an end face facing toward the medium facing surface 60. This end face of the nonmagnetic metal layer 24 is located at a distance from the medium facing surface 60. The nonmagnetic metal layer 24 functions as a heat sink for dissipating heat generated at the plasmon generator 21 outward from the plasmon generator 21. The nonmagnetic metal layer 24 is formed of Au, for example. The insulating layer 23 is formed of the same material as the cladding layers 17, 19 and 20, for example.

The write head unit further includes a dielectric layer 25 disposed around the insulating layer 23 and the nonmagnetic metal layer 24, and a dielectric layer 26 disposed on the nonmagnetic metal layer 24 and the dielectric layer 25. The dielectric layer 26 has an end face facing toward the medium facing surface 60. This end face of the dielectric layer 26 is located farther from the medium facing surface 60 than is the end face of the nonmagnetic metal layer 24. The dielectric layers 25 and 26 are formed of the same material as the cladding layers 17, 19 and 20, for example.

The fourth layers of the coupling portions 13A and 13B are embedded in the cladding layer 20 and the dielectric layers 22, 25 and 26. The coupling layer 27 is disposed on the fourth layers of the coupling portions 13A and 13B and the dielectric layer 26.

The coil 40 includes a first layer 41 and a second layer 42. The first layer 41 lies on the dielectric layer 26. As shown in FIG. 6, the first layer 41 is wound approximately three turns around the coupling layer 27. The write head unit further includes insulating layers 28 and 29. The insulating layer 28 is disposed in the space between adjacent turns of the first layer 41, and around the coupling layer 27 and the first layer 41. The insulating layer 29 is disposed on the nonmagnetic metal layer 24, the dielectric layer 26, the first layer 41 and the insulating layer 28 so as to cover a portion of the nonmagnetic metal layer 24, a portion of the dielectric layer 26, the first layer 41, and the insulating layer 28. The insulating layers 28 and 29 are formed of alumina, for example.

The main pole 30 is disposed on the insulating layers 23 and 29 and the nonmagnetic metal layer 24 such that the plasmon generator 21 is interposed between the main pole 30 and the core 18. The main pole 30 has the first end face 30a, and further has a top surface 30b which is a surface lying at the front-side end of the main pole 30 in the direction of travel of the recording medium 80 (the Z direction). The shape of the main pole 30 will be described in detail later.

The coupling layer 31 lies on the coupling layer 27. The second layer 42 lies on the insulating layer 29. As shown in FIG. 7, the second layer 42 is wound approximately two turns around the coupling layer 31. The write head unit further includes insulating layers 32 and 33. The insulating layer 32 is disposed in the space between adjacent turns of the second layer 42, and around the main pole 30, the coupling layer 31 and the second layer 42. The top surfaces of the main pole 30, the coupling layer 31, the second layer 42 and the insulating layer 32 are even with each other. The insulating layer 33 lies on the second layer 42 and the insulating layer 32. The insulating layers 32 and 33 are formed of alumina, for example.

The first yoke portion 34 lies on the main pole 30, the coupling layer 31 and the insulating layer 33, and is in contact with the top surface 30b of the main pole 30 and the top surface of the coupling layer 31. The first yoke portion 34 has an end face facing toward the medium facing surface 60 and located at a distance from the medium facing surface 60. The write head unit further includes an insulating layer 35 disposed around the first yoke portion 34. The insulating layer 35 is formed of alumina, for example.

The thermally-assisted magnetic recording head further includes a protective layer 36 disposed to cover the write head unit. The protective layer 36 is formed of alumina, for example.

As has been described, the thermally-assisted magnetic recording head according to the present embodiment includes the medium facing surface 60, the read head unit, and the write head unit. The read head unit and the write head unit are stacked on the substrate 1. The write head unit is located on the trailing side, i.e., the front side in the direction of travel of the recording medium 80 (the Z direction), relative to the read head unit.

The write head unit includes the coil 40, the main pole 30, the waveguide, the return path section R, and the plasmon generator 21. The return path section R includes the first yoke portion 34, the shield 15, and the connecting part RC. The connecting part RC includes the return pole layer 11, the coupling layers 12, 27 and 31, and the two coupling portions 13A and 13B. The waveguide includes the core 18 and the cladding. The cladding includes the cladding layers 17, 19 and 20.

The main pole 30 has the first end face 30a located in the medium facing surface 60. The return path section R has the second end face Ra, i.e., the end face 15a of the shield 15, located in the medium facing surface 60. The second end face Ra is located on the leading side, i.e., the rear side in the direction of travel of the recording medium 80, relative to the first end face 30a.

The main pole 30 further has the top surface 30b, which is a surface lying at the front-side end of the main pole 30 in the direction of travel of the recording medium 80. The first yoke portion 34 is located on the trailing side or the front side in the direction of travel of the recording medium 80 (the Z direction) relative to the main pole 30, and is in contact with the top surface 30b of the main pole 30.

The main pole 30 is located on the front side in the direction of travel of the recording medium 80 relative to the core 18. The core 18 has the front end face 18a located in the medium facing surface 60. The front end face 18a is located between the first end face 30a and the second end face Ra in the direction of travel of the recording medium 80.

The shield 15 captures a disturbance magnetic field applied to the thermally-assisted magnetic recording head from the outside thereof. This makes it possible to prevent the disturbance magnetic field from being intensively captured into the main pole 30 and thereby causing erroneous writing on the recording medium 80. The shield 15 also has the function of capturing a magnetic flux that is produced from the first end face 30a of the main pole 30 and spreads in directions other than the direction perpendicular to the plane of the recording medium 80, and thereby preventing the magnetic flux from reaching the recording medium 80. It is thereby possible to increase the write field intensity gradient. Further, the shield 15, the first yoke portion 34 and the connecting part RC of the return path section R have the function of allowing a magnetic flux that has been produced from the first end face 30a of the main pole 30 and has magnetized a portion of the recording medium 80 to flow back to the main pole 30.

The shape and location of the coil 40 will now be described in detail with reference to FIG. 4, FIG. 6 and FIG. 7. As shown in FIG. 6, the first layer 41 of the coil 40 is wound approximately three turns around the coupling layer 27. The first layer 41 includes three coil elements 411, 412 and 413 extending to pass through a location which is between the core 18 and the first yoke portion 34 and between the main pole 30 and the coupling layer 27. Note that a coil element refers to a portion of the coil winding. The coil elements 411, 412 and 413 are adjacent in the direction perpendicular to the medium facing surface 60 and arranged in this order from the medium facing surface 60 side. The first layer 41 has a coil connection 41E electrically connected to the second layer 42 of the coil 40.

As shown in FIG. 7, the second layer 42 is wound approximately two turns around the coupling layer 31. The second layer 42 includes two coil elements 421 and 422 extending to pass through a location which is between the core 18 and the first yoke portion 34 and between the main pole 30 and the coupling layer 31. The coil elements 421 and 422 are adjacent in the direction perpendicular to the medium facing surface 60 and arranged in this order from the medium facing surface 60 side. The second layer 42 has a coil connection 42S electrically connected to the coil connection 41E of the first layer 41. The coil connection 42S penetrates the insulating layer 29 and is electrically connected to the coil connection 41E. In the example shown in FIG. 6 and FIG. 7, the first layer 41 and the second layer 42 are connected in series.

The coil elements 411 to 413, 421 and 422 correspond to the plurality of coil elements of the present invention. The plurality of coil elements include a specific coil element. In the present embodiment, the coil element 411 is the specific coil element. Since the first layer 41 and the second layer 42 are portions of the coil 40, the coil 40 can be said to include the plurality of coil elements 411 to 413, 421 and 422.

Reference is now made to FIG. 3 to describe the shape of the specific coil element 411, and the shape and location of the main pole 30 in detail. FIG. 3 shows a cross section that intersects the first end face 30a of the main pole 30 and that is perpendicular to the medium facing surface 60 and parallel to the direction of travel of the recording medium 80 (the Z direction). This cross section will hereinafter be referred to as the main cross section. As shown in FIG. 3, in the main cross section the specific coil element 411 has: a bottom end portion E11 lying at the rear-side end of the specific coil element 411 in the direction of travel of the recording medium 80 (the Z direction); a top end portion E12 lying at the front-side end of the specific coil element 411 in the direction of travel of the recording medium 80; a front end portion E13 closest to the medium facing surface 60; and a rear end portion E14 farthest from the medium facing surface 60.

Here, as shown in FIG. 3, assume a first imaginary plane P1 and a second imaginary plane P2 which are perpendicular to the direction of travel of the recording medium 80, and a third imaginary plane P3 and a fourth imaginary plane P4 which are parallel to the medium facing surface 60. The first imaginary plane P1 passes through the bottom end portion E11 of the specific coil element 411. The second imaginary plane P2 passes through the top end portion E12 of the specific coil element 411. The third imaginary plane P3 passes through the front end portion E13 of the specific coil element 411. The fourth imaginary plane P4 passes through the rear end portion E14 of the specific coil element 411.

The main pole 30 includes a first portion 301 lying between the first and second imaginary planes P1 and P2, and a second portion 302 lying between the third and fourth imaginary planes P3 and P4. The first portion 301 is located closer to the medium facing surface 60 than is the specific coil element 411. The second portion 302 is located on the front side in the direction of travel of the recording medium 80 relative to the specific coil element 411. In brief, the main pole 30 rides over the specific coil element 411. The insulating layer 29 is interposed between the specific coil element 411 and the first and second portions 301 and 302.

The specific coil element 411 has a first inclined surface 411a facing toward the medium facing surface 60. The distance from the medium facing surface 60 to an arbitrary point on the first inclined surface 411a decreases with decreasing distance from the arbitrary point to the first imaginary plane P1.

In the main cross section, the bottom end portion E11 is a straight line included in the first imaginary plane P1, the top end portion E12 is a straight line included in the second imaginary plane P2, and the rear end portion E14 is a straight line included in the fourth imaginary plane P4. In the main cross section, the front end portion E13 is a point. The specific coil element 411 has a trapezoidal cross-sectional shape in the main cross section. In the main cross section, the top end portion E12 may be a point. In such a case, the specific coil element 411 has a triangular cross-sectional shape in the main cross section.

The main pole 30 has, in addition to the first end face 30a and the top surface 30b, a second inclined surface 30c opposed to the first inclined surface 411a. The distance from the medium facing surface 60 to an arbitrary point on the second inclined surface 30c decreases with decreasing distance from the arbitrary point to the top surface 1a of the substrate 1. In the present embodiment, a portion of the main pole 30 that is enclosed by the second imaginary plane P2, the third imaginary plane P3 and the second inclined surface 30c is included in both of the first portion 301 and the second portion 302.

In the present embodiment, the entire main pole 30 including the first and second portions 301 and 302 is formed of a single layer. The present embodiment thus allows the first and second portions 301 and 302 to be formed simultaneously. This facilitates the formation of the main pole 30.

As shown in FIG. 6 and FIG. 7, the main pole 30 includes: a narrow portion 30A having an end face located in the medium facing surface 60 and an end opposite to this end face; and a wide portion 30B connected to the end of the narrow portion 30A. The wide portion 30B is greater than the narrow portion 30A in width in the track width direction (the X direction). The width of the narrow portion 30A in the track width direction is generally constant regardless of distance from the medium facing surface 60. The width of the wide portion 30B in the track width direction is the same as that of the narrow portion 30A at the boundary between the narrow portion 30A and the wide portion 30B, and gradually increases with increasing distance from the medium facing surface 60, then becoming constant. The narrow portion 30A has a length in the range of, for example, 0 to 0.3 μm in the direction perpendicular to the medium facing surface 60. Where this length is 0, the narrow portion 30A is not present and thus the wide portion 30B has an end face located in the medium facing surface 60.

An example of the shape of the plasmon generator 21 will now be described with reference to FIG. 2. The plasmon generator 21 has a plasmon exciting part 21a serving as a bottom surface, a top surface 21b, a front end face 21c located in the medium facing surface 60, a rear end face 21d opposite to the front end face 21c, and two side surfaces 21e and 21f. The plasmon exciting part 21a is located at a predetermined distance from the evanescent light generating surface 18b of the core 18 and faces the evanescent light generating surface 18b. The cladding layer 20 is interposed between the evanescent light generating surface 18b and the plasmon exciting part 21a. For example, the plasmon generator 21 is rectangular in cross section parallel to the medium facing surface 60.

The front end face 21c includes a near-field light generating part 21g located at the front extremity of the plasmon exciting part 21a. The near-field light generating part 21g is located between the first end face 30a of the main pole 30 and the second end face Ra of the return path section R, i.e., the end face 15a of the shield 15. In the present embodiment, the first end face 30a is located on the front side in the direction of travel of the recording medium 80 relative to the near-field light generating part 21g. The near-field light generating part 21g is configured to generate near-field light on the principle to be described later.

As shown in FIG. 2, the plasmon generator 21 includes a narrow portion located in the vicinity of the medium facing surface 60, and a wide portion which is located farther from the medium facing surface 60 than is the narrow portion. The narrow portion has a front end face located in the medium facing surface 60. The front end face of the narrow portion also serves as the front end face 21c of the plasmon generator 21. The width of the narrow portion in the direction parallel to the medium facing surface 60 and to the top surface 1a of the substrate 1 (the X direction) may be constant regardless of distance from the medium facing surface 60 or may decrease with increasing proximity to the medium facing surface 60. The wide portion is located on a side of the narrow portion farther from the front end face 21c and is coupled to the narrow portion. The width of the wide portion is the same as that of the narrow portion at the boundary between the narrow portion and the wide portion, and increases with increasing distance from the narrow portion.

The width (the dimension in the track width direction (the X direction)) of the front end face 21c is defined by the width of the narrow portion in the medium facing surface 60. The width of the front end face 21c falls within the range of 5 to 40 nm, for example. The height (the dimension in the Z direction) of the front end face 21c is defined by the height of the narrow portion in the medium facing surface 60. The height of the front end face 21c falls within the range of 5 to 40 nm, for example.

Now, the principle of generation of near-field light in the present embodiment and the principle of thermally-assisted magnetic recording using near-field light will be described in detail. Laser light emitted from a laser diode (not illustrated) enters the core 18. As shown in FIG. 4, the laser light 50 propagates through the core 18 toward the medium facing surface 60, and reaches the vicinity of the plasmon generator 21. The evanescent light generating surface 18b of the core 18 generates evanescent light based on the laser light 50 propagating through the core 18. More specifically, the laser light 50 is totally reflected at the evanescent light generating surface 18b, and the evanescent light generating surface 18b thereby generates evanescent light that permeates into the cladding layer 20. In the plasmon generator 21, surface plasmons are excited on the plasmon exciting part 21a through coupling with the aforementioned evanescent light. The surface plasmons propagate to the near-field light generating part 21g, and the near-field light generating part 21g generates near-field light based on the surface plasmons.

The near-field light generated from the near-field light generating part 21g is projected toward the recording medium 80, reaches the surface of the recording medium 80 and heats a part of the magnetic recording layer of the recording medium 80. This lowers the coercivity of the part of the magnetic recording layer. In thermally-assisted magnetic recording, the part of the magnetic recording layer with the lowered coercivity is subjected to a write magnetic field produced by the main pole 30 for data writing.

The specific functions and effects of the thermally-assisted magnetic recording head according to the present embodiment will now be described. In the present embodiment, the coil 40 includes the specific coil element 411. The main pole 30 includes the first portion 301 which is located closer to the medium facing surface 60 than is the specific coil element 411, and the second portion 302 which is located on the front side in the direction of travel of the recording medium 80 relative to the specific coil element 411. In brief, the main pole 30 rides over the specific coil element 411. This feature of the present embodiment makes it possible to increase the number of turns of the coil 40 without increasing the length of the magnetic path including the main pole 30 and the return path section R, and consequently allows for performance improvement. This advantageous effect will now be described by comparison with a thermally-assisted magnetic recording head of a comparative example.

Figure 8:
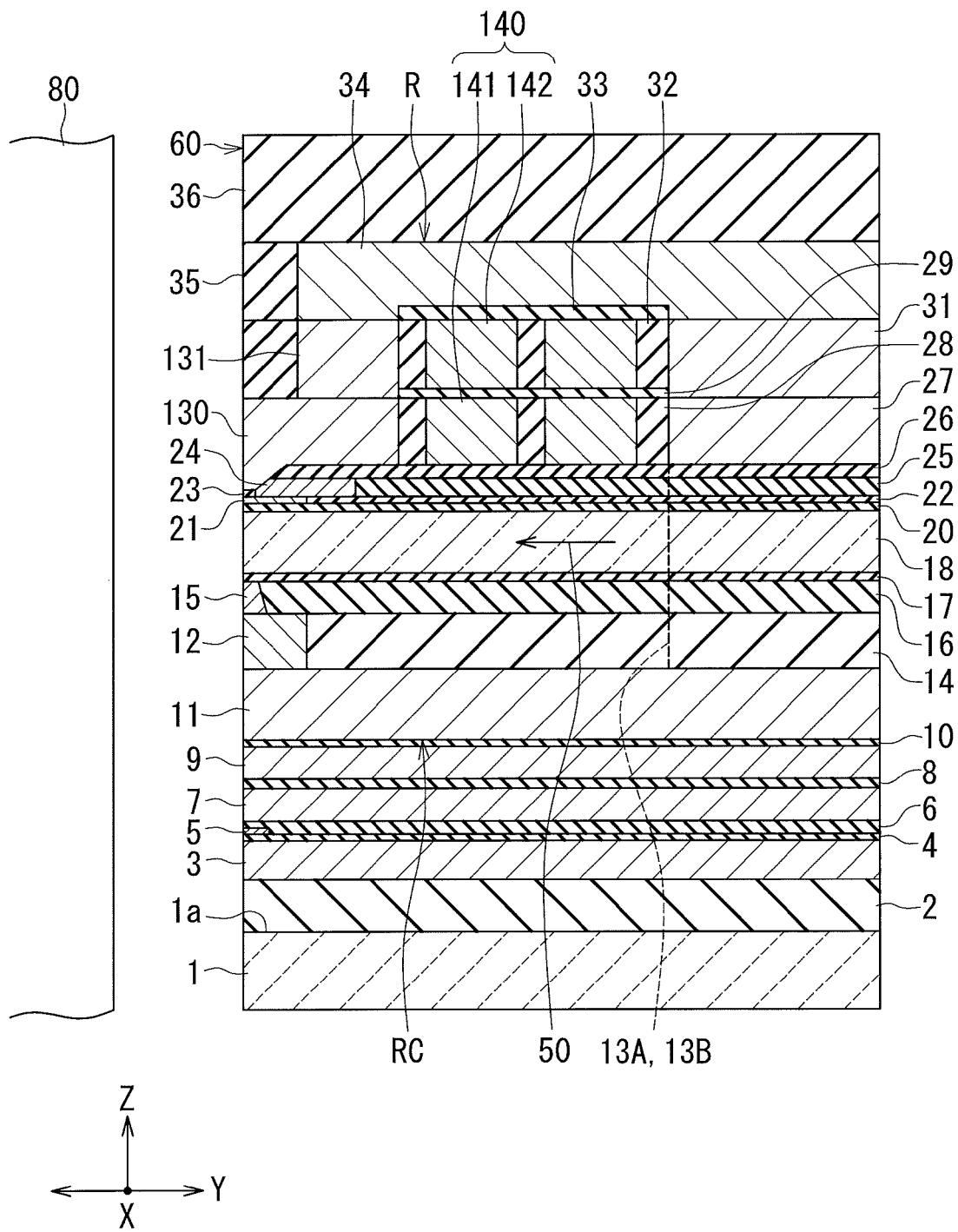
FIG. 8 is a cross-sectional view showing the configuration of a thermally-assisted magnetic recording head of a comparative example.

FIG. 8 is a cross-sectional view showing the configuration of the thermally-assisted magnetic recording head of the comparative example. The thermally-assisted magnetic recording head of the comparative example includes a main pole 130 and a coil 140 instead of the main pole 30 and the coil 40 of the present embodiment. In the thermally-assisted magnetic recording head of the comparative example, the insulating layer 29 does not cover the nonmagnetic metal layer 24 and the dielectric layer 26. The main pole 130 lies on the insulating layer 23, the nonmagnetic metal layer 24 and the dielectric layer 26.

The thermally-assisted magnetic recording head of the comparative example includes a coupling layer 131 formed of a magnetic material and disposed on the main pole 130. The coupling layer 131 has an end face facing toward the medium facing surface 60, and a top surface which is a surface lying at the front-side end of the coupling layer 131 in the direction of travel of the recording medium 80 (the Z direction). The end face of the coupling layer 131 is located at a distance from the medium facing surface 60. In the thermally-assisted magnetic recording head of the comparative example, the first yoke portion 34 is in contact with the top surface of the coupling layer 131. Further, in the thermally-assisted magnetic recording head of the comparative example, the return path section R is constituted by the first yoke portion 34, the shield 15, the coupling layer 131, and the connecting part RC (the return pole layer 11, the coupling layers 12, 27 and 31 and the coupling portions 13A and 13B).

The coil 140 includes a first layer 141 and a second layer 142. The first layer 141 is disposed on the dielectric layer 26 and wound approximately two turns around the coupling layer 27. In the thermally-assisted magnetic recording head of the comparative example, the insulating layer 28 is disposed in the space between adjacent turns of the first layer 141, and around the main pole 130, the coupling layer 27 and the first layer 141. The top surfaces of the main pole 130, the coupling layer 27, the first layer 141 and the insulating layer 28 are even with each other. The insulating layer 29 is disposed on the first layer 141 and the insulating layer 28.

The second layer 142 is disposed on the insulating layer 29 and wound approximately two turns around the coupling layer 31. In the thermally-assisted magnetic recording head of the comparative example, the insulating layer 32 is disposed in the space between adjacent turns of the second layer 142, and around the coupling layers 31 and 131 and the second layer 142. The top surfaces of the coupling layers 31 and 131, the second layer 142 and the insulating layer 32 are even with each other. The insulating layer 33 is disposed on the second layer 142 and the insulating layer 32.

Further, the coil 140 includes four coil elements extending to pass between the core 18 and the first yoke portion 34. The main pole 130 rides over none of the four coil elements. More specifically, the main pole 130 does not include any portion located on the front side in the direction of travel of the recording medium 80 (the Z direction) relative to the four coil elements.

In the thermally-assisted magnetic recording head of the comparative example, the number of turns of the coil 140 is approximately four. In the thermally-assisted magnetic recording head of the comparative example, an increase in the number of turns of the coil 140 results in an increase in length of the magnetic path including the main pole 130 and the return path section R. This consequently gives rise to problems such as sluggish rise of the write current flowing through the coil 140 and a reduction in the write current in a high frequency region.

In the present embodiment, in contrast, the main pole 30 rides over the specific coil element 411. This makes it possible to increase the number of turns of the coil 40 by the number of the specific coil element 411 without increasing the length of the magnetic path including the main pole 30 and the return path section R. In the thermally-assisted magnetic recording head according to the present embodiment shown in FIG. 4, the number of turns of the coil 40 is larger by the number of the specific coil element 411 when compared with the thermally-assisted magnetic recording head of the comparative example. Nevertheless, the locations of the first yoke portion 34 and the coupling layers 27 and 31 do not differ between FIG. 4 and FIG. 8. In other words, there is no difference between FIG. 4 and FIG. 8 in the length of the magnetic path including the main pole (30 or 130) and the return path section R. This is because the main pole 30 and the specific coil element 411 of the present embodiment are arranged to overlap each other when viewed in a direction perpendicular to the top surface 30b of the main pole 30.

The present embodiment makes it possible to increase the magnetomotive force produced by the coil 40 to allow the main pole 30 to produce a write magnetic field of greater magnitude without causing the aforementioned problems resulting from an increase in length of the magnetic path including the main pole 30 and the return path section R. This consequently allows for improvement of the signal-to-noise ratio (S/N) of the write head unit. As a result, even when the power of the laser light for exciting surface plasmons on the plasmon generator 21 is reduced to thereby reduce the intensity of the surface plasmons excited on the plasmon generator 21 and the intensity of near-field light generated from the plasmon generator 21, it becomes possible to make up for the performance reduction of the write head unit resulting therefrom. Consequently, the present embodiment permits reduction in the laser light power so that the plasmon generator 21 will generate a smaller amount of heat. This makes it possible to prevent the problem that the heat generated by the plasmon generator 21 causes the plasmon generator 21 to shrink and become distant from the medium facing surface 60 and causes corrosion of the main pole 30 to consequently reduce the life of the thermally-assisted magnetic recording head.

Further, in the present embodiment, the specific coil element 411 has the first inclined surface 411a, and the main pole 30 has the second inclined surface 30c opposed to the first inclined surface 411a. These features of present embodiment make it possible to bring the specific coil element 411 into closer proximity to the medium facing surface 60, thereby allowing for further reduction in length of the magnetic path including the main pole 30 and the return path section R.

Second Embodiment

Figure 9:
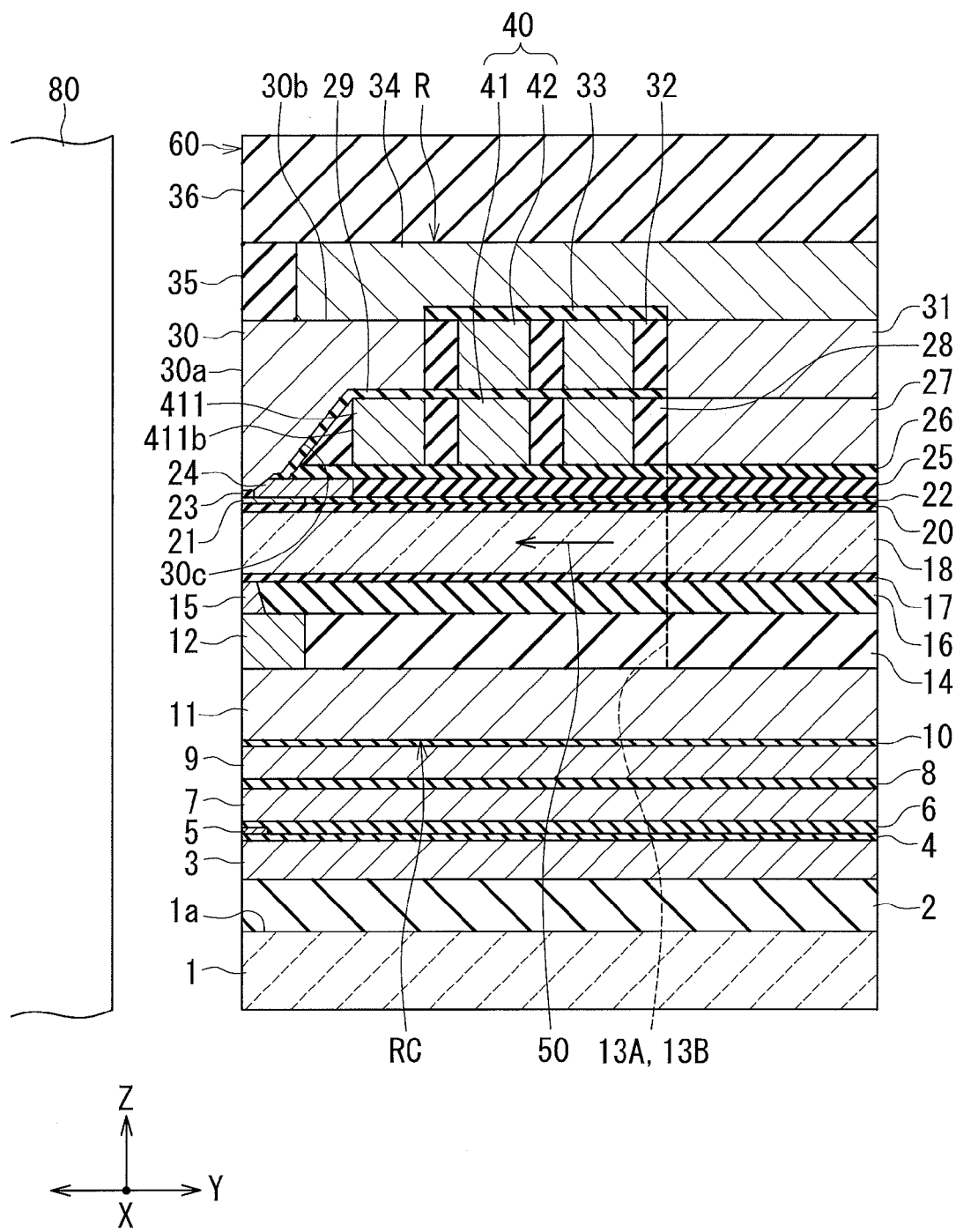
FIG. 9 is a cross-sectional view showing the configuration of a thermally-assisted magnetic recording head according to a second embodiment of the invention.

A thermally-assisted magnetic recording head according to a second embodiment of the invention will now be described with reference to FIG. 9. FIG. 9 is a cross-sectional view showing the configuration of the thermally-assisted magnetic recording head. In the present embodiment, the specific coil element 411 of the coil 40 differs in shape from the first embodiment. More specifically, in the present embodiment, the specific coil element 411 has an end face 411b facing toward the medium facing surface 60, instead of the first inclined surface 411a. The end face 411b of the specific coil element 411 is parallel to the medium facing surface 60.

In the present embodiment, the front end portion E13 of the specific coil element 411 is part of the end face 411b, and is a straight line parallel to the medium facing surface 60. The third imaginary plane P3 passes through this front end portion E13. In the present embodiment, the specific coil element 411 has a square or rectangular cross-sectional shape in the main cross section.

The insulating layers 28 and 29 are interposed between the end face 411b of the specific coil element 411 and the second inclined surface 30c (see FIG. 3) of the main pole 30. The insulating layer 28 has an inclined surface opposed to the second inclined surface 30c of the main pole 30. The distance from the medium facing surface 60 to an arbitrary point on this inclined surface decreases with decreasing distance from the arbitrary point to the top surface 1a of the substrate 1.

The remainder of configuration, function and effects of the present embodiment are similar to those of the first embodiment.

Third Embodiment

Figure 10:
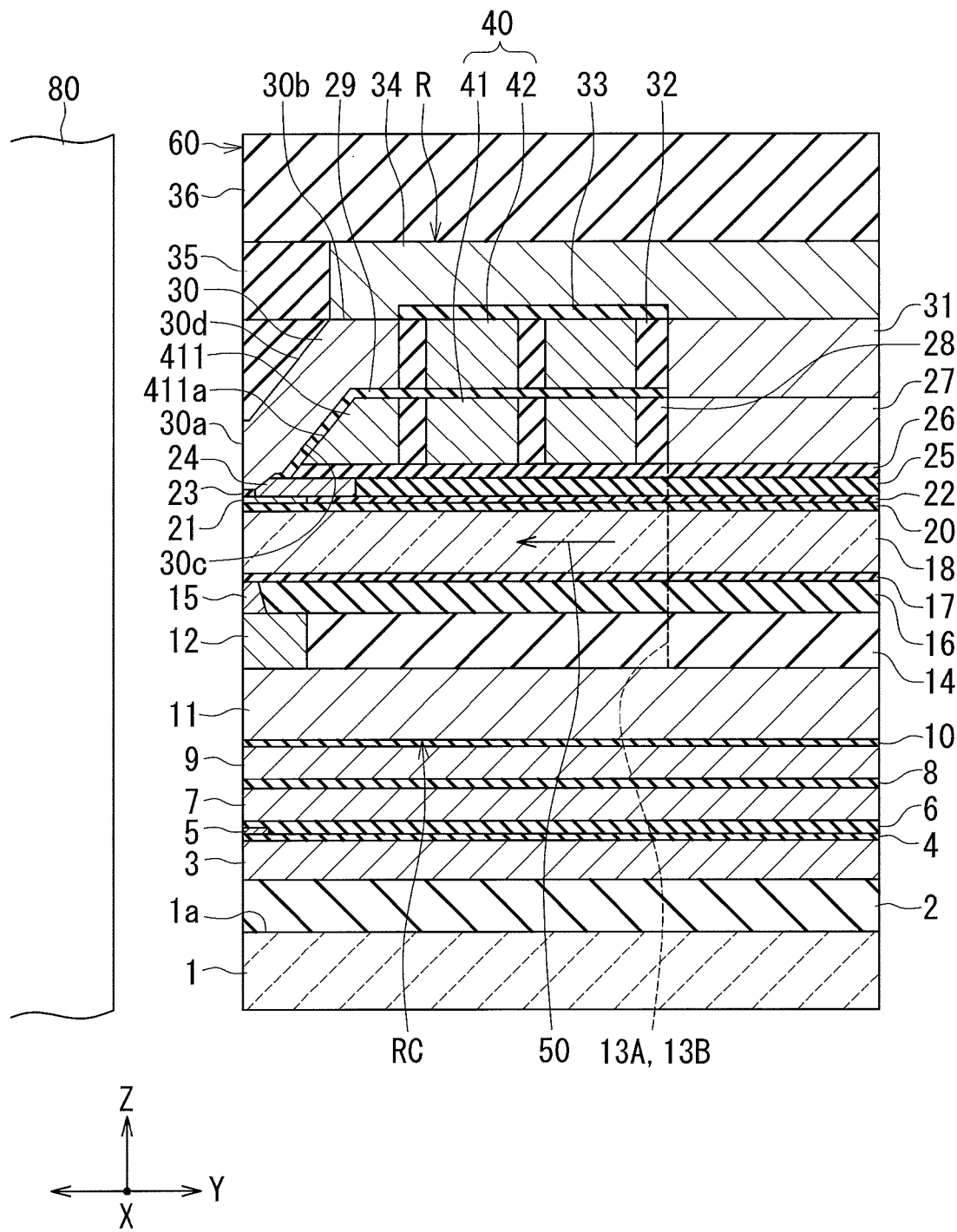
FIG. 10 is a cross-sectional view showing the configuration of a thermally-assisted magnetic recording head according to a third embodiment of the invention.

A thermally-assisted magnetic recording head according to a third embodiment of the invention will now be described with reference to FIG. 10. FIG. 10 is a cross-sectional view showing the configuration of the thermally-assisted magnetic recording head. In the present embodiment, the main pole 30 differs in shape from the first embodiment. The main pole 30 of the present embodiment has such a shape that a portion of the main pole 30 of the first embodiment near the ridge between the first end face 30a and the top surface 30b is cut away. The main pole 30 of the present embodiment has a connecting surface 30d connecting the first end face 30a and the top surface 30b to each other. The connecting surface 30d includes a flat portion and an inclined portion, the flat portion being closer to the medium facing surface 60 than is the inclined portion. In the main pole 30, one end of the flat portion is located in the medium facing surface 60, the other end of the flat portion is connected to one end of the inclined portion, and the other end of the inclined portion is connected to the top surface 30b. The distance from the medium facing surface 60 to an arbitrary point on the inclined portion decreases with decreasing distance from the arbitrary point to the top surface 1a of the substrate 1.

The specific coil element 411 of the coil 40 of the present embodiment may have the same shape as the second embodiment. The remainder of configuration, function and effects of the present embodiment are similar to those of the first or second embodiment.

Fourth Embodiment

Figure 11:
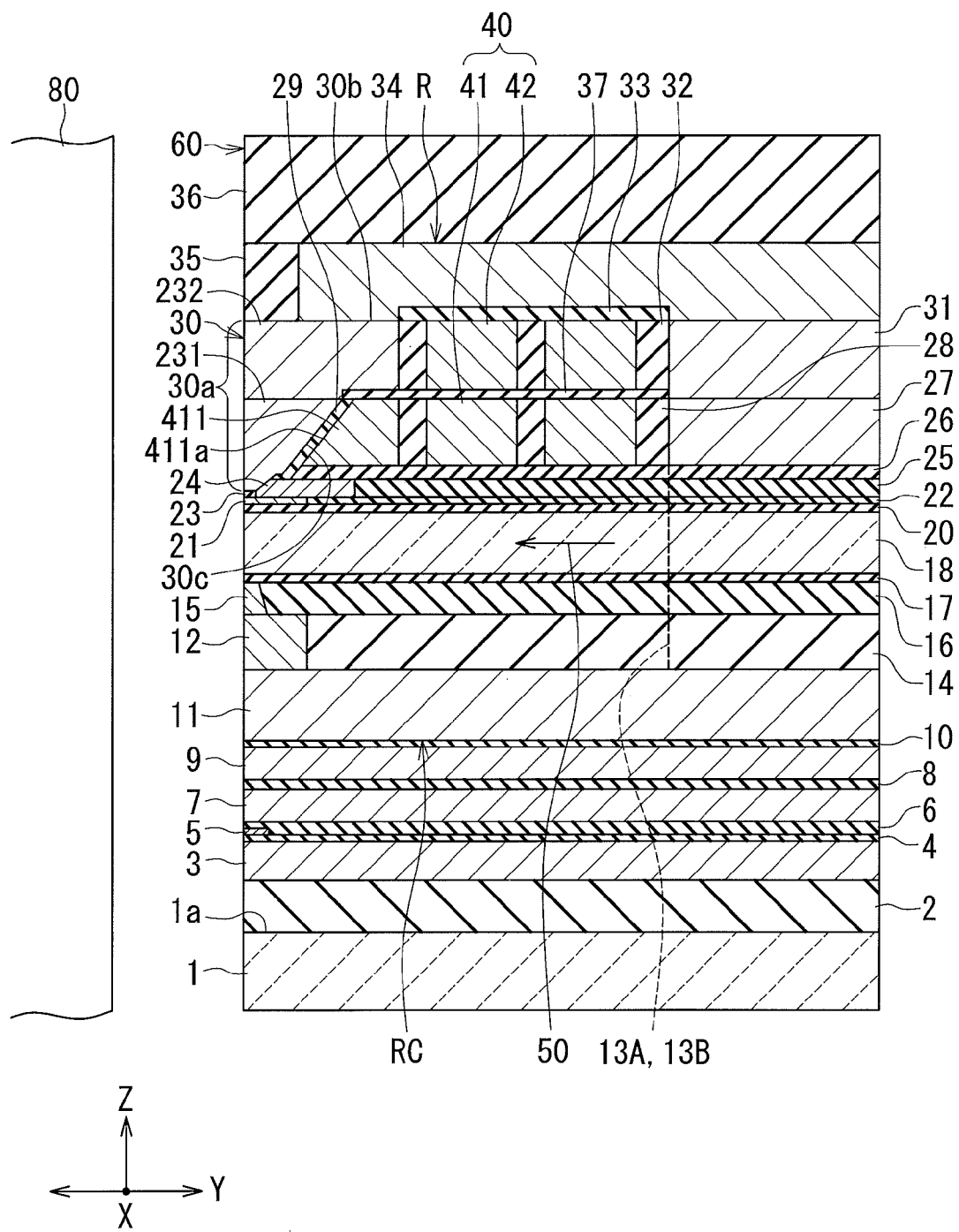
FIG. 11 is a cross-sectional view showing the configuration of a thermally-assisted magnetic recording head according to a fourth embodiment of the invention.

A thermally-assisted magnetic recording head according to a fourth embodiment of the invention will now be described with reference to FIG. 11. FIG. 11 is a cross-sectional view showing the configuration of the thermally-assisted magnetic recording head. The present embodiment differs from the first embodiment in that the entire main pole 30 is not formed of a single layer. More specifically, in the present embodiment, the main pole 30 includes a first layer 231, and a second layer 232 lying on the first layer 231. Each of the first layer 231 and the second layer 232 has an end face located in the medium facing surface 60, and a top surface which is a surface lying on the front-side end of the first or second layer 231 or 232 in the direction of travel of the recording medium 80 (the Z direction). The first end face 30a of the main pole 30 is constituted by the end face of the first layer 231 and the end face of the second layer 232. The top surface 30b of the main pole 30 is formed by the top surface of the second layer 232.

The first layer 231 of the main pole 30 is disposed on the insulating layers 23 and 29 and the nonmagnetic metal layer 24. In the present embodiment, the insulating layer 28 is disposed in the space between adjacent turns of the first layer 41 of the coil 40, and around the first layer 231 of the main pole 30, the coupling layer 27 and the first layer 41. The top surfaces of the first layer 231 of the main pole 30, the coupling layer 27, the first layer 41 and the insulating layer 28 are even with each other. In the present embodiment, the insulating layer 29 does not cover the first layer 41 and the insulating layer 28. Instead, the thermally-assisted magnetic recording head according to the present embodiment includes an insulating layer 37 lying on the first layer 41 and the insulating layer 28. The insulating layer 37 is formed of alumina, for example.

In the present embodiment, the second layer 42 of the coil 40 is disposed on the insulating layer 37. The insulating layer 32 is disposed in the space between adjacent turns of the second layer 42, and around the second layer 232 of the main pole 30, the coupling layer 31 and the second layer 42. The top surfaces of the second layer 232 of the main pole 30, the coupling layer 31, the second layer 42 and the insulating layer 32 are even with each other.

The present embodiment cannot provide the effect resulting from the configuration that the entire main pole 30 is formed of a single layer. The specific coil element 411 of the coil 40 of the present embodiment may have the same shape as the second embodiment. The remainder of configuration, function and effects of the present embodiment are similar to those of the first or second embodiment.

Fifth Embodiment

Figure 12:
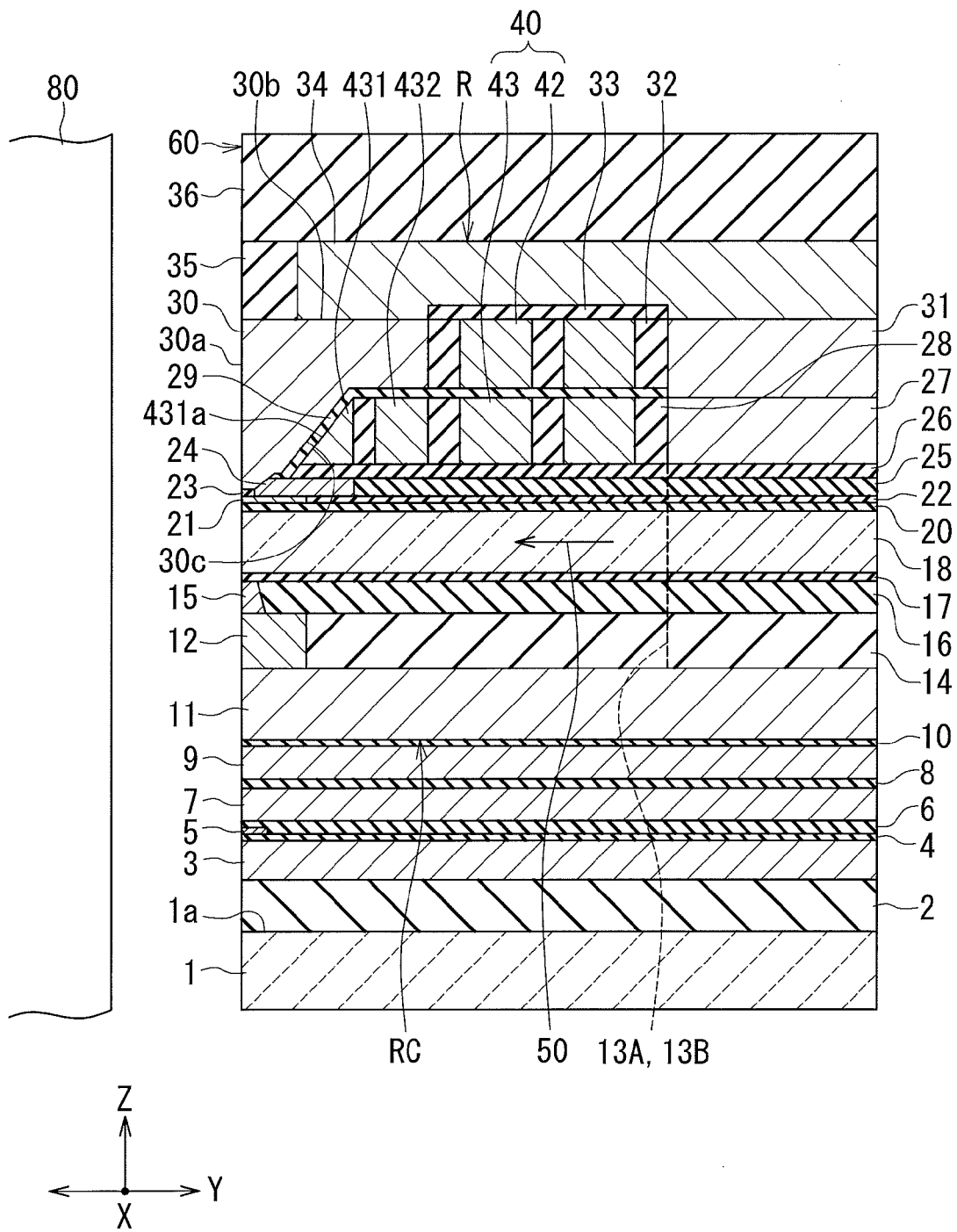
FIG. 12 is a cross-sectional view showing the configuration of a thermally-assisted magnetic recording head according to a fifth embodiment of the invention.
Figure 13:
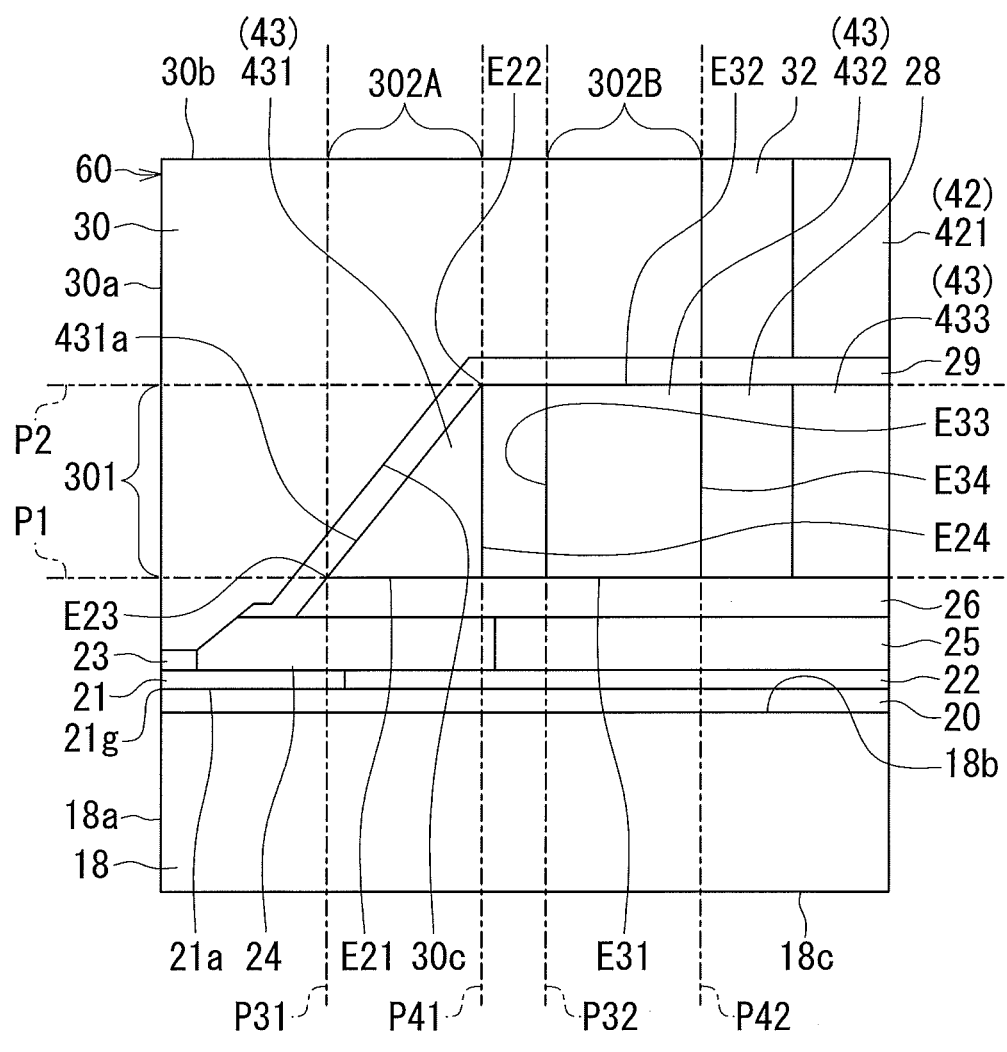
FIG. 13 is a cross-sectional view showing the main part of the thermally-assisted magnetic recording head according to the fifth embodiment of the invention.

A thermally-assisted magnetic recording head according to a fifth embodiment of the invention will now be described with reference to FIG. 12 and FIG. 13. FIG. 12 is a cross-sectional view showing the configuration of the thermally-assisted magnetic recording head. FIG. 13 is a cross-sectional view showing the main part of the thermally-assisted magnetic recording head. The present embodiment differs from the first embodiment in the shape of the first layer of the coil 40. More specifically, in the present embodiment, the coil 40 has a first layer 43 instead of the first layer 41 of the first embodiment. The first layer 43 is wound approximately four turns around the coupling layer 27.

In the present embodiment, the insulating layer 28 is disposed in the space between adjacent turns of the first layer 43, and around the coupling layer 27 and the first layer 43. The insulating layer 29 is disposed on the nonmagnetic metal layer 24, the dielectric layer 26, the first layer 43 and the insulating layer 28.

The first layer 43 includes four coil elements extending to pass through a location which is between the core 18 and the first yoke portion 34 and between the main pole 30 and the coupling layer 27. The four coil elements are adjacent in the direction perpendicular to the medium facing surface 60. As shown in FIG. 13, the first, the second, and the third coil element, counting from the medium facing surface 62 side, are denoted by reference numerals 431, 432, and 433, respectively. The first layer 43 has a non-illustrated coil connection electrically connected to the coil connection 42S (see FIG. 7) of the second layer 42 of the coil 40.

Each of the coil elements 431 and 432 corresponds to the specific coil element of the present invention. FIG. 13 shows the main cross section. As shown in FIG. 13, in the main cross section the specific coil element 431 has: a bottom end portion E21 lying at the rear-side end of the specific coil element 431 in the direction of travel of the recording medium 80; a top end portion E22 lying at the front-side end of the specific coil element 431 in the direction of travel of the recording medium 80; a front end portion E23 closest to the medium facing surface 60; and a rear end portion E24 farthest from the medium facing surface 60. In the main cross section the specific coil element 432 has: a bottom end portion E31 lying at the rear-side end of the specific coil element 432 in the direction of travel of the recording medium 80; a top end portion E32 lying at the front-side end of the specific coil element 432 in the direction of travel of the recording medium 80; a front end portion E33 closest to the medium facing surface 60; and a rear end portion E34 farthest from the medium facing surface 60.

Here, as shown in FIG. 13, assume a first imaginary plane P1 and a second imaginary plane P2 which are perpendicular to the direction of travel of the recording medium 80. The first imaginary plane P1 passes through the bottom end portion E21 of the specific coil element 431 and the bottom end portion E31 of the specific coil element 432. The second imaginary plane P2 passes through the top end portion E22 of the specific coil element 431 and the top end portion E32 of the specific coil element 432.

Further, as shown in FIG. 13, assume two third imaginary planes P31 and P32 and two fourth imaginary planes P41 and P42 which are parallel to the medium facing surface 60. The third imaginary plane P31 passes through the front end portion E23 of the specific coil element 431. The third imaginary plane P32 passes through the front end portion E33 of the specific coil element 432. The fourth imaginary plane P41 passes through the rear end portion E24 of the specific coil element 431. The fourth imaginary plane P42 passes through the rear end portion E34 of the specific coil element 432.

The main pole 30 includes a first portion 301 lying between the first and second imaginary planes P1 and P2, and two second portions 302A and 302B. The second portion 302A lies between the third and fourth imaginary planes P31 and P41. The second portion 302B lies between the third and fourth imaginary planes P32 and P42. The first portion 301 is located closer to the medium facing surface 60 than are the specific coil elements 431 and 432. The second portion 302A is located on the front side in the direction of travel of the recording medium 80 relative to the specific coil element 431. The second portion 302B is located on the front side in the direction of travel of the recording medium 80 relative to the specific coil element 432. In brief, the main pole 30 rides over the specific coil elements 431 and 432. The insulating layer 29 is interposed between the specific coil element 431 and the first and second portions 301 and 302A, and between the specific coil element 432 and the second portion 302B.

The specific coil element 431 has a first inclined surface 431a facing toward the medium facing surface 60. The distance from the medium facing surface 60 to an arbitrary point on the first inclined surface 431a decreases with decreasing distance from the arbitrary point to the first imaginary plane P1.

In the main cross section, the bottom end portion E21 is a straight line included in the first imaginary plane P1, and the rear end portion E24 is a straight line included in the fourth imaginary plane P41. In the main cross section, each of the top end portion E22 and the front end portion E23 is a point. The specific coil element 431 has a triangular cross-sectional shape in the main cross section. In the main cross section, the top end portion E22 may be a straight line included in the second imaginary plane P2. In such a case, the specific coil element 431 has a trapezoidal cross-sectional shape in the main cross section.

In the main cross section, the bottom end portion E31 is a straight line included in the first imaginary plane P1, the top end portion E32 is a straight line included in the second imaginary plane P2, the front end portion E33 is a straight line included in the third imaginary plane P32, and the rear end portion E34 is a straight line included in the fourth imaginary plane P42. The specific coil element 432 has a square or rectangular cross-sectional shape in the main cross section.

In the present embodiment, the second inclined surface 30c of the main pole 30 is opposed to the first inclined surface 431a. In the present embodiment, a portion of the main pole 30 that is enclosed by the second imaginary plane P2, the third imaginary plane P31 and the second inclined surface 30c is included in both of the first portion 301 and the second portion 302A.

In the present embodiment, the number of turns of the coil 40 is approximately six, being larger than the number of turns of the coil 40 of the first embodiment. The present embodiment thus allows the coil 40 to produce greater magnetomotive force and thereby allows the main pole 30 to produce a write magnetic field of greater magnitude when compared with the first embodiment.

The main pole 30 of the present embodiment may have the same configuration as the third or fourth embodiment. The remainder of configuration, function and effects of the present embodiment are similar to those of the first, third or fourth embodiment.

Sixth Embodiment

Figure 14:
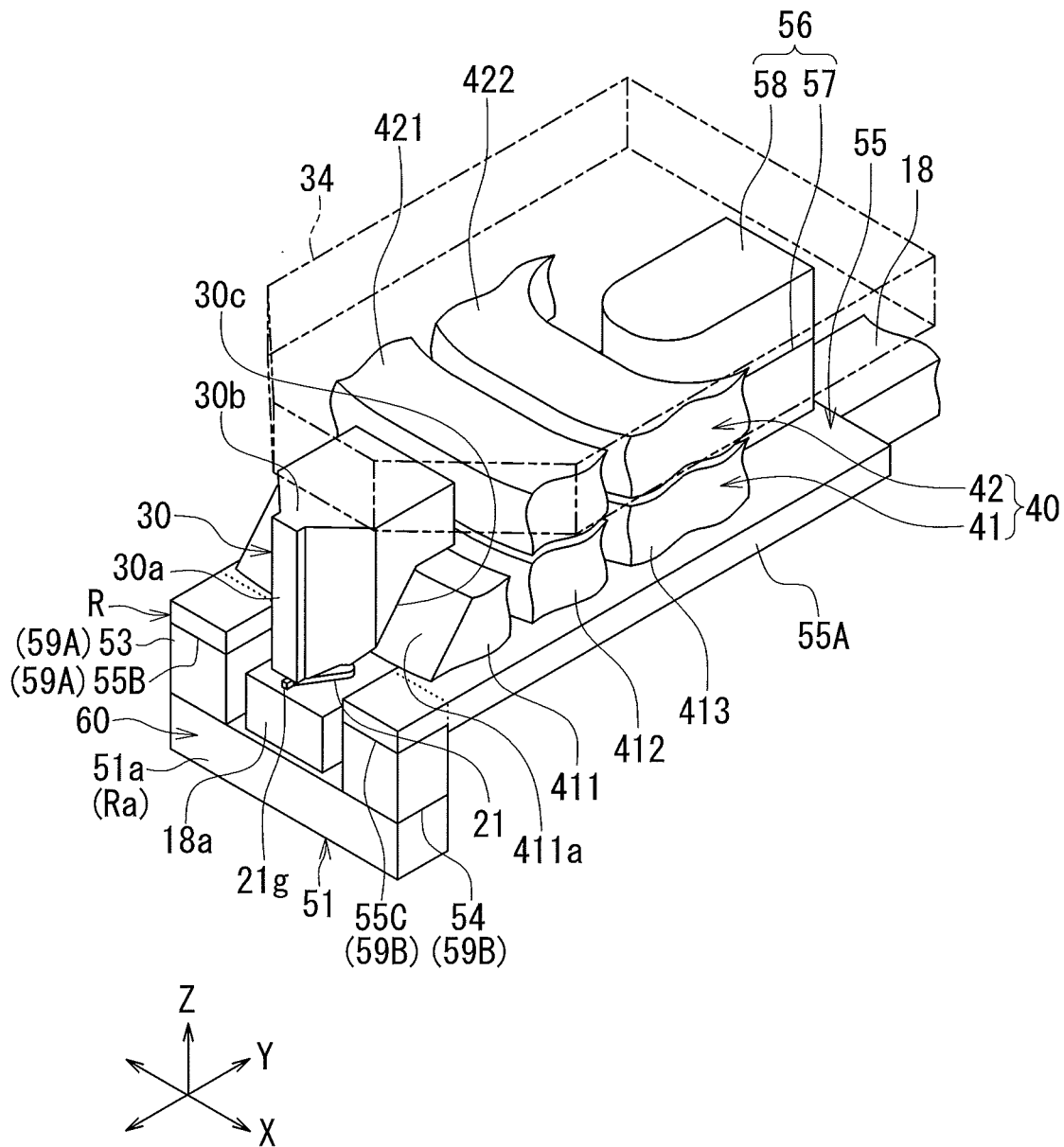
FIG. 14 is a perspective view showing the main part of a thermally-assisted magnetic recording head according to a sixth embodiment of the invention.
Figure 15:
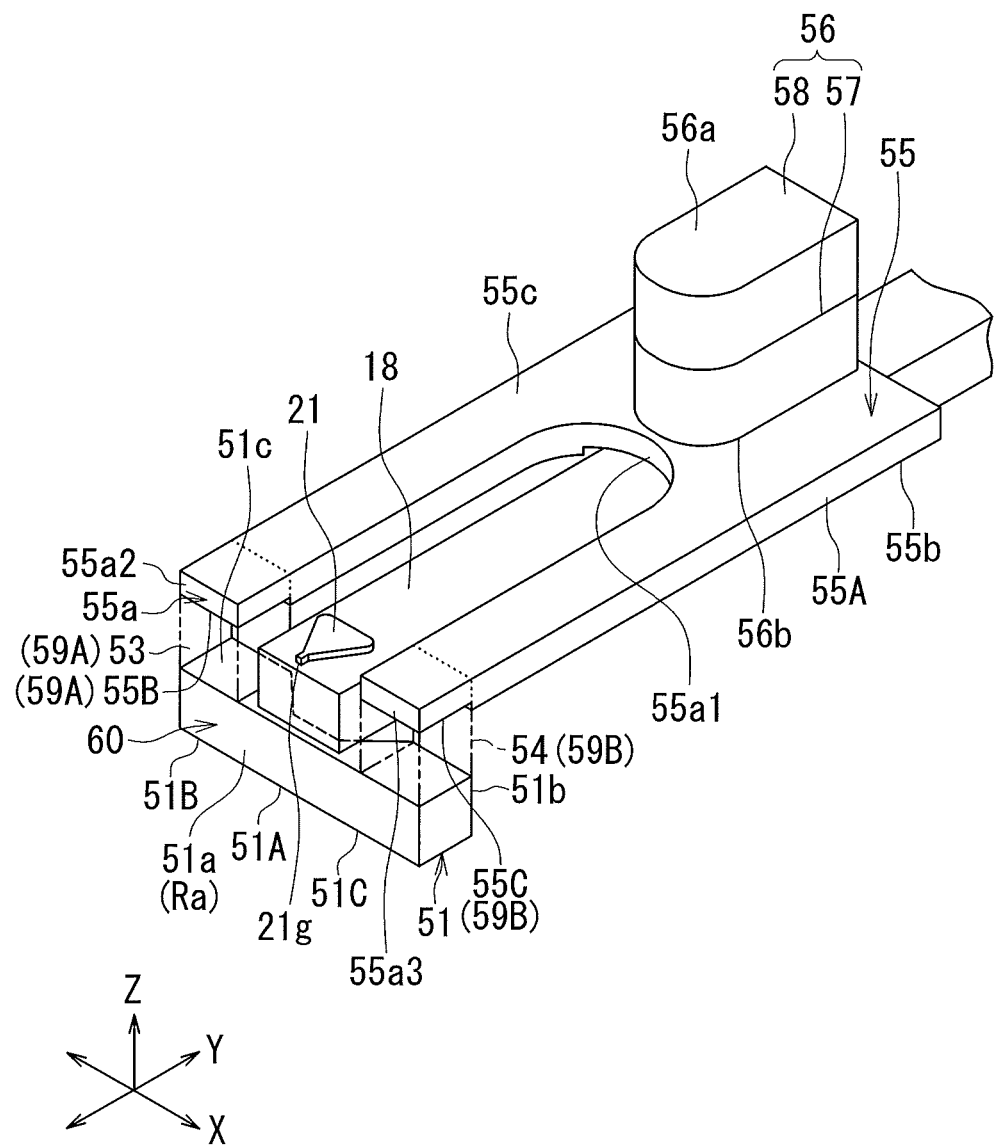
FIG. 15 is a perspective view showing a part of FIG. 14.
Figure 16:
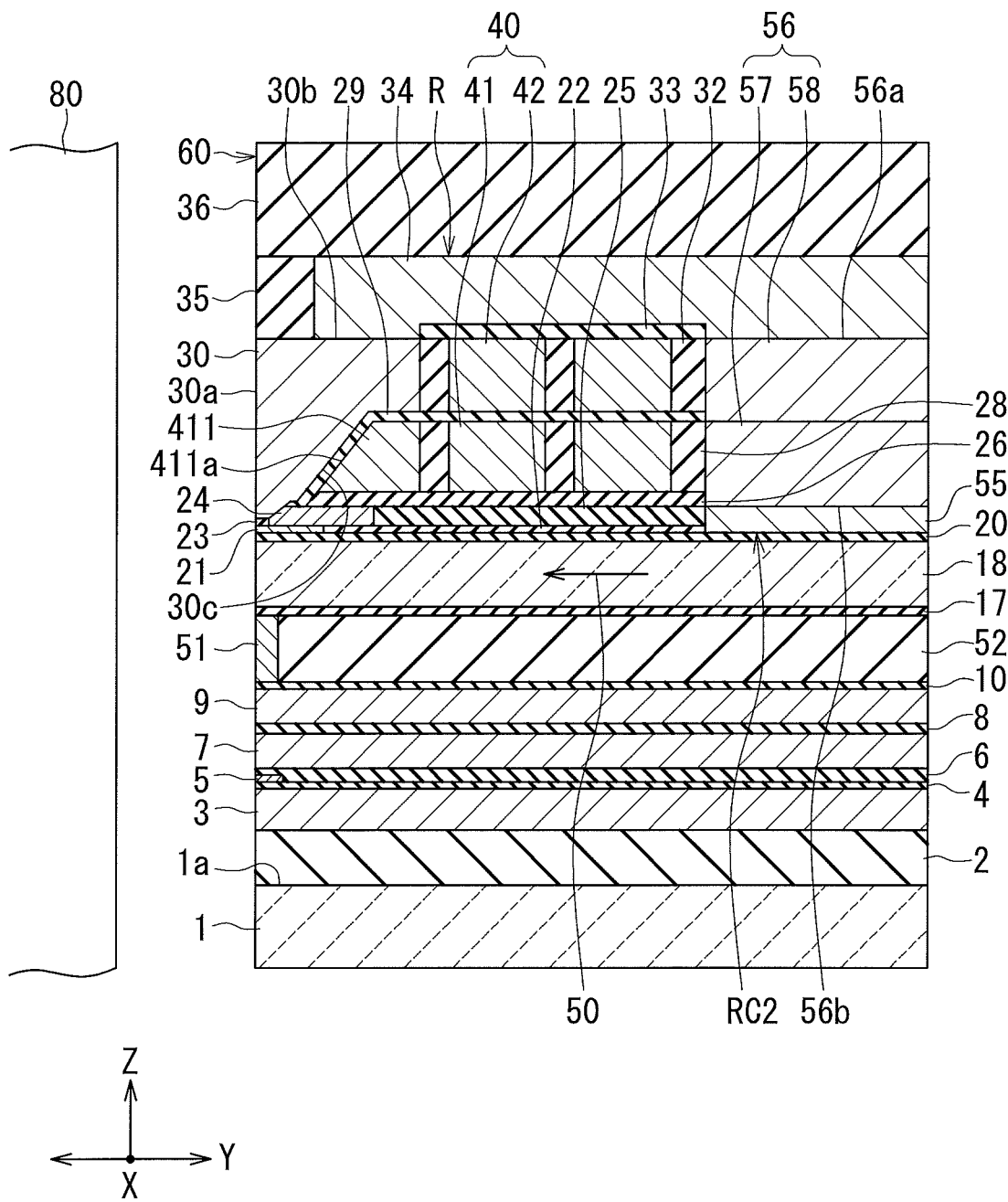
FIG. 16 is a cross-sectional view showing the configuration of the thermally-assisted magnetic recording head according to the sixth embodiment of the invention.
Figure 17:
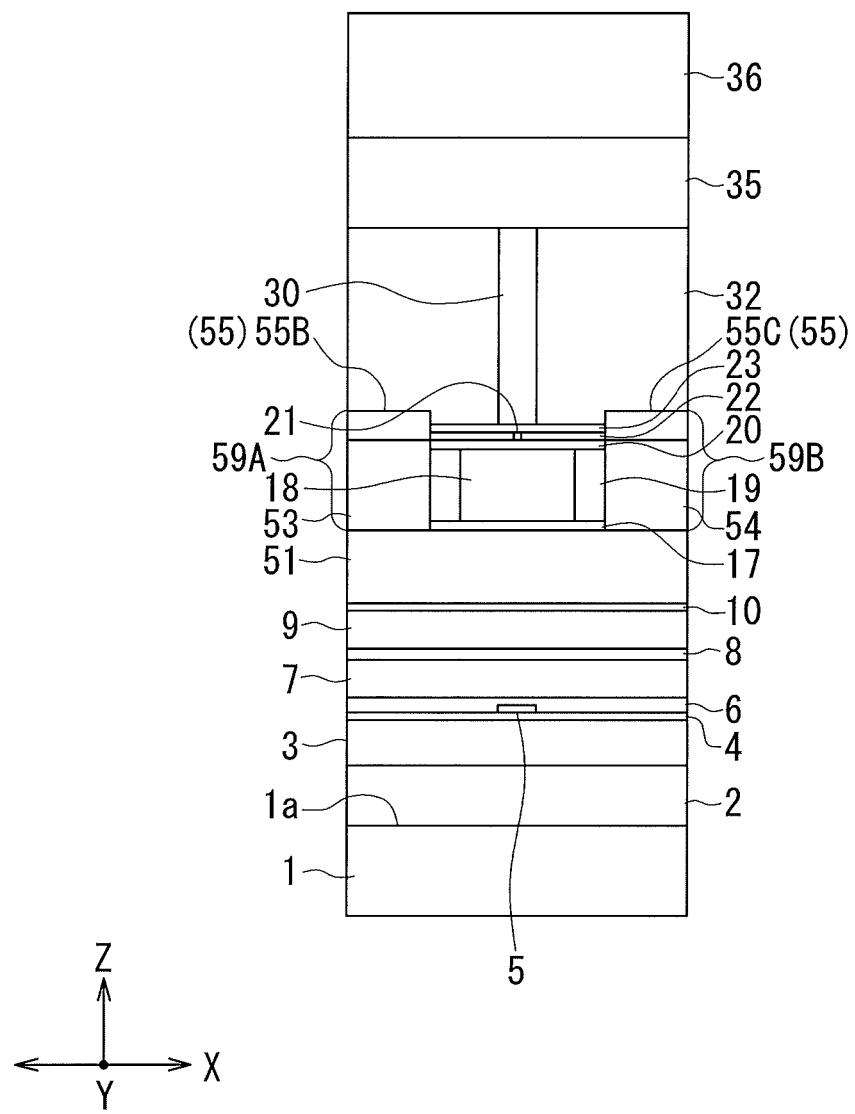
FIG. 17 is a front view showing the medium facing surface of the thermally-assisted magnetic recording head according to the sixth embodiment of the invention.
Figure 18:
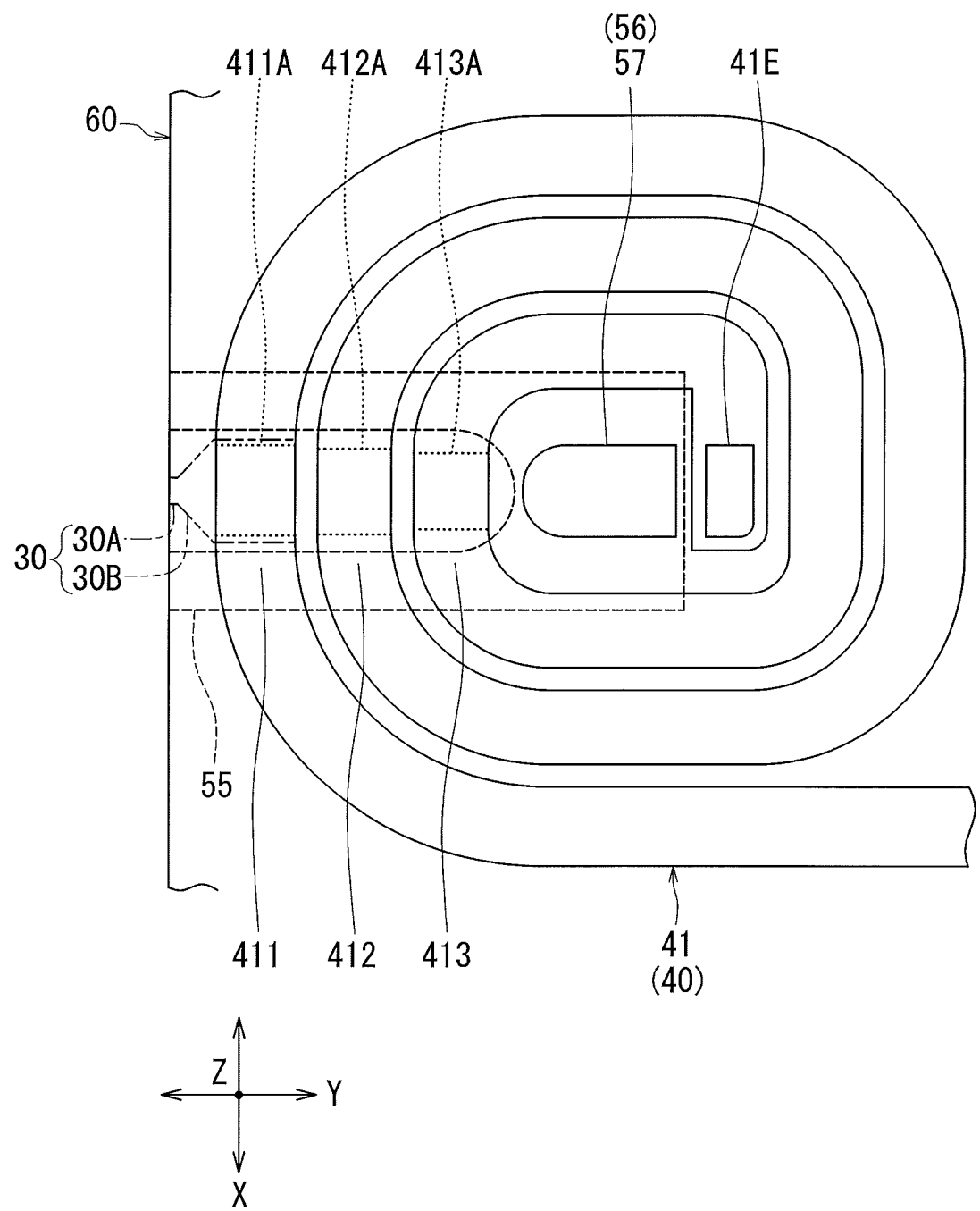
FIG. 18 is a plan view showing a first layer of the coil of the sixth embodiment of the invention.
Figure 19:
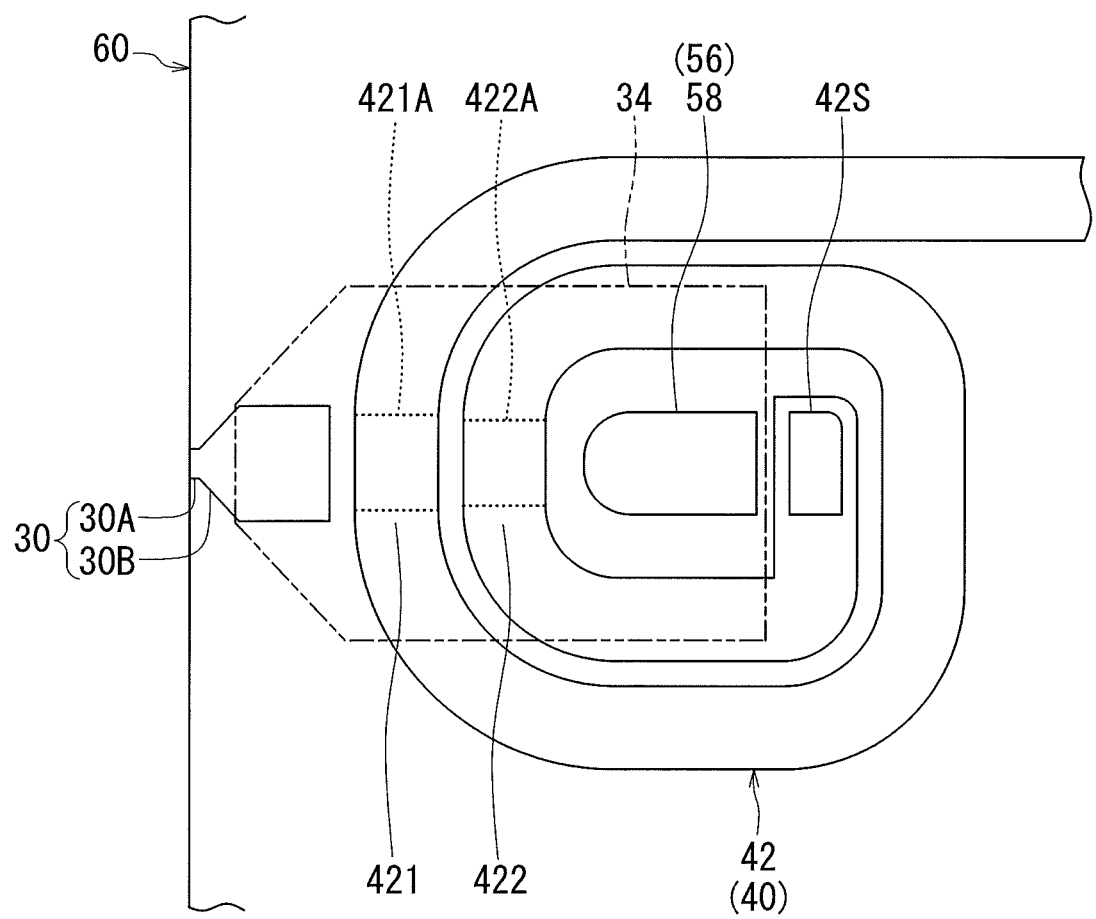
FIG. 19 is a plan view showing a second layer of the coil of the sixth embodiment of the invention.

A thermally-assisted magnetic recording head according to a sixth embodiment of the invention will now be described with reference to FIG. 14 to FIG. 19. FIG. 14 is a perspective view showing the main part of the thermally-assisted magnetic recording head. FIG. 15 is a perspective view showing a part of FIG. 14. FIG. 16 is a cross-sectional view showing the configuration of the thermally-assisted magnetic recording head. FIG. 17 is a front view showing the medium facing surface of the thermally-assisted magnetic recording head. FIG. 18 is a plan view showing a first layer of a coil of the present embodiment. FIG. 19 is a plan view showing a second layer of the coil of the present embodiment.

The configuration of the thermally-assisted magnetic recording head according to the present embodiment differs from the first embodiment in the following ways. Components of the return path section R of the first embodiment other than the first yoke portion 34, that is, the return pole layer 11, the coupling layer 12, the coupling portions 13A and 13B, the shield 15, and the coupling layers 27 and 31, are eliminated from the thermally-assisted magnetic recording head according to the present embodiment. Instead, the return path section R of the present embodiment includes a shield 51, and a connecting part RC2 connecting the shield 51 and the first yoke portion 34 to each other. The connecting part RC2 includes a second yoke portion 55A, a first columnar portion 56, a second columnar portion 59A, and a third columnar portion 59B. The insulating layers 14 and 16 and the non-illustrated insulating layer disposed around the return pole layer 11 are also omitted in the present embodiment.

The shield 51 lies on the nonmagnetic layer 10. As shown in FIG. 15, the shield 51 has an end face 51a located in the medium facing surface 60, a rear end face 51b opposite to the end face 51a, and a top surface 51c. In the present embodiment, in particular, the end face 51a of the shield 51 also serves as the second end face Ra of the return path section R. In other words, the shield 51 includes the second end face Ra.

The shield 51 includes a central portion 51A, and further includes a first side portion 51B and a second side portion 51C located on opposite sides of the central portion 51A in the track width direction (the X direction). The length of the central portion 51A in the direction perpendicular to the medium facing surface 60 is constant regardless of position in the track width direction. The maximum length of each of the side portions 51B and 51C in the direction perpendicular to the medium facing surface 60 is greater than the length of the central portion 51A in that direction.

The thermally-assisted magnetic recording head according to the present embodiment includes an insulating layer 52 lying on the nonmagnetic layer 10 and surrounding the shield 51. The insulating layer 52 is formed of alumina, for example.

The thermally-assisted magnetic recording head according to the present embodiment further includes a magnetic layer 55 formed of a magnetic material, lying on the cladding layer 19 and spaced a predetermined distance apart from the plasmon generator 21, the nonmagnetic metal layer 24 and the main pole 30. The magnetic layer 55 is embedded in the cladding layer 20, the dielectric layers 22 and 25 and the insulating layer 32. As shown in FIG. 15, the magnetic layer 55 has a front end face 55a facing toward the medium facing surface 60, a bottom surface 55b, and a top surface 55c. The front end face 55a of the magnetic layer 55 includes a first portion 55a1, and further includes a second portion 55a2 and a third portion 55a3 located on opposite sides of the first portion 55a1 in the track width direction. The first portion 55a1 is shaped to be recessed such that the track-widthwise center of the first portion 55a1 is farthest from the medium facing surface 60. The first portion 55a1 is disposed to surround the plasmon generator 21, the nonmagnetic metal layer 24 and a portion of the main pole 30. The second and third portions 55a2 and 55a3 are located in the medium facing surface 60 at positions on opposite sides of the near-field light generating part 21g of the plasmon generator 21 in the track width direction.

The magnetic layer 55 includes a second yoke portion 55A as its main portion. The magnetic layer 55 further includes two coupling portions 55B and 55C located in the vicinity of the medium facing surface 60 at positions on opposite sides of the plasmon generator 21 in the track width direction and coupled to the second yoke portion 55A. In FIG. 14 and FIG. 15, the boundaries between the second yoke portion 55A and the coupling portions 55B and 55C are indicated in dotted lines. The coupling portion 55B includes the second portion 55a2 of the front end face 55a. The coupling portion 55C includes the third portion 55a3 of the front end face 55a.

The thermally-assisted magnetic recording head according to the present embodiment further includes two magnetic layers 53 and 54 each formed of a magnetic material. The two magnetic layers 53 and 54 are located in the vicinity of the medium facing surface 60 at positions on opposite sides of the core 18 in the track width direction. The magnetic layers 53 and 54 penetrate the cladding layers 17, 19 and 20, and connect the shield 51 and the magnetic layer 55 to each other. Each of the magnetic layers 53 and 54 has a front end face located in the medium facing surface 60, a top surface, and a bottom surface. The bottom surface of the magnetic layer 53 is in contact with a portion of the top surface 51c of the shield 51 that is included in the first side portion 51B. The bottom surface of the magnetic layer 54 is in contact with a portion of the top surface 51c of the shield 51 that is included in the second side portion 51C.

The top surface of the magnetic layer 53 is in contact with a portion of the bottom surface 55b of the magnetic layer 55 that is included in the coupling portion 55B. The top surface of the magnetic layer 54 is in contact with a portion of the bottom surface 55b of the magnetic layer 55 that is included in the coupling portion 55C.

The second columnar portion 59A is constituted by the magnetic layer 53 and the coupling portion 55B of the magnetic layer 55. The third columnar portion 59B is constituted by the magnetic layer 54 and the coupling portion 55C of the magnetic layer 55. As shown in FIG. 14, FIG. 15 and FIG. 17, the second columnar portion 59A and the third columnar portion 59B are located on opposite sides of the plasmon generator 21 in the track width direction.

The first columnar portion 56 has a first end 56a and a second end 56b opposite to each other in the direction of travel of the recording medium 80. In the present embodiment, the first end 56a lies at the front-side end of the first columnar portion 56 in the direction of travel of the recording medium 80, i.e., the trailing-side end of the first columnar portion 56, whereas the second end 56b lies at the rear-side end of the first columnar portion 56 in the direction of travel of the recording medium 80, i.e., the leading-side end of the first columnar portion 56.

The first columnar portion 56 includes a first layer 57 and a second layer 58. The first layer 57 includes the second end 56b and lies on a portion of the top surface 55c of the magnetic layer 55 at a position farther from the medium facing surface 60 than the main pole 30. The second layer 58 includes the first end 56a and lies on the first layer 57. The first layer 57 is embedded in the dielectric layer 26 and the insulating layer 28. The second layer 58 is embedded in the insulating layer 32.

In the present embodiment, the first layer 41 of the coil 40 is wound approximately three turns around the first layer 57 of the first columnar portion 56. The second layer 42 of the coil 40 is wound approximately two turns around the second layer 58 of the first columnar portion 56. The first yoke portion 34 lies on the main pole 30, the second layer 58 of the first columnar portion 56 and the insulating layer 33.

As has been described, the return path section R of the present embodiment includes the first yoke portion 34, the shield 51, and the connecting part RC2. The connecting part RC2 includes the second yoke portion 55A, the first columnar portion 56, the second columnar portion 59A, and the third columnar portion 59B. As shown in FIG. 15 and FIG. 16, the first yoke portion 34, the second yoke portion 55A and the first columnar portion 56 are located on the trailing side or the front side in the direction of travel of the recording medium 80 relative to the core 18. The first columnar portion 56 is located away from the medium facing surface 60 and has the first end 56a and the second end 56b. As shown in FIG. 14 and FIG. 15, the second and third columnar portions 59A and 59B are located closer to the medium facing surface 60 than is the first columnar portion 56.

The first yoke portion 34 connects the main pole 30 to the first end 56a of the first columnar portion 56. The second columnar portion 59A and the third columnar portion 59B are located on opposite sides of the plasmon generator 21 in the track width direction and connected to the shield 51. The second yoke portion 55A is connected to the second end 56b of the first columnar portion 56, and connected to the shield 51 via the second and third columnar portions 59A and 59B.

The shield 51 has the same functions as those of the shield 15 described in the first embodiment section. Specifically, the shield 51 has the functions of capturing a disturbance magnetic field applied to the thermally-assisted magnetic recording head from the outside thereof; capturing a magnetic flux that is produced from the first end face 30a of the main pole 30 and spreads in directions other than the direction perpendicular to the plane of the recording medium 80, and thereby preventing the magnetic flux from reaching the recording medium 80; and allowing a magnetic flux that has been produced from the first end face 30a of the main pole 30 and has magnetized a portion of the recording medium 80 to flow back to the main pole 30.

The shape and location of the coil 40 of the present embodiment will now be described with reference to FIG. 18 and FIG. 19. As shown in FIG. 18, the first layer 41 of the coil 40 is wound approximately three turns around the first layer 57 of the first columnar portion 56. As has been described in the first embodiment section, the first layer 41 includes the three coil elements 411, 412 and 413. In the present embodiment, the three coil elements 411, 412 and 413 extend to pass through a location which is between the core 18 and the first yoke portion 34 and between the main pole 30 and the first layer 57 of the first columnar portion 56. In the present embodiment, in particular, the three coil elements 411, 412 and 413 include conductor portions (hereinafter referred to as linear conductor portions) 411A, 412A and 413A, respectively, the linear conductor portions 411A, 412A and 413A lying between the first layer 57 of the first columnar portion 56 and the medium facing surface 60 and extending linearly in parallel to the medium facing surface 60. Each of the linear conductor portions 411A, 412A and 413A has a constant width in the direction perpendicular to the medium facing surface 60 (the Y direction). In FIG. 18, the positions of opposite ends of each of the linear conductor portions 411A, 412A and 413A in the track width direction (the X direction) are indicated in dotted lines. This also applies to other drawings that show other linear conductor portions.

As shown in FIG. 19, the second layer 42 of the coil 40 is wound approximately two turns around the second layer 58 of the first columnar portion 56. As has been described in the first embodiment section, the second layer 42 includes the two coil elements 421 and 422. In the present embodiment, the two coil elements 421 and 422 extend to pass through a location which is between the core 18 and the first yoke portion 34 and between the main pole 30 and the second layer 58 of the first columnar portion 56. In the present embodiment, in particular, the two coil elements 421 and 422 include linear conductor portions 421A and 422A, respectively, the linear conductor portions 421A and 422A lying between the second layer 58 of the first columnar portion 56 and the medium facing surface 60. Each of the linear conductor portions 421A and 422A has a constant width in the direction perpendicular to the medium facing surface 60 (the Y direction).

The specific functions and effects of the thermally-assisted magnetic recording head according to the present embodiment will now be described. In the present embodiment, the near-field light generating part 21g of the plasmon generator 21 is located between the first end face 30a of the main pole 30 and the second end face Ra of the return path section R, i.e., the end face 51a of the shield 51. Part of the core 18 is located in the vicinity of the plasmon generator 21. The core 18 and the return path section R are configured to intersect each other without contacting each other. More specifically, the second and third columnar portions 59A and 59B of the connecting part RC2 of the return path section R are located on opposite sides of the core 18 in the track width direction without contacting the core 18.

In the present embodiment, the first yoke portion 34 of the return path section R and the second yoke portion 55A and the first columnar portion 56 of the connecting part RC2 of the return path section R are located on the front side in the direction of travel of the recording medium 80 relative to the core 18, and the coil 40 is wound around the first columnar portion 56. The present embodiment allows the first columnar portion 56 to be small in width in the track width direction regardless of the distance between the respective outer ends of the second and third columnar portions 59A and 59B in the track width direction. The present embodiment thus allows the coil 40 to be small in entire length.

In order to improve the write characteristics in a high frequency band, it is desirable that the magnetic path formed by the main pole 30 and the return path section R be reduced in length. To achieve this, it is effective to bring the first columnar portion 56 into close proximity to the medium facing surface 60. In the present embodiment, the coil 40 is wound around the first columnar portion 56 which is small in width in the track width direction. Accordingly, even if the first columnar portion 56 is brought into close proximity to the medium facing surface 60, it is possible to avoid an increase in length of each of the linear conductor portions 411A to 413A of the first layer 41 of the coil 40 located between the first layer 57 of the first columnar portion 56 and the medium facing surface 60 and an increase in length of each of the linear conductor portions 421A and 422A of the second layer 42 of the coil 40 located between the second layer 58 of the first columnar portion 56 and the medium facing surface 60. The present embodiment thus allows the first columnar portion 56 to be located close to the medium facing surface 60 without causing a significant increase in resistance of the coil 40. Consequently, the present embodiment makes it possible to reduce the entire length of the coil 40 while reducing the length of the magnetic path. The present embodiment is thus able to provide a thermally-assisted magnetic recording head that exhibits excellent write characteristics in a high frequency band and has the coil 40 of low resistance.

Further, the present embodiment allows the coil 40 to have a low heating value because of its low resistance. This makes it possible to prevent the occurrence of a problem that components around the coil 40 may expand to cause part of the medium facing surface 60 to protrude toward the recording medium 80 and thus become more likely to collide with the recording medium 80. Further, the present embodiment allows for a reduction in the distance between the medium facing surface 60 and the recording medium 80 for improvements in write characteristics such as the overwrite property.

The specific coil element 411 of the coil 40 of the present embodiment may have the same shape as the second embodiment. The main pole 30 of the present embodiment may have the same configuration as the third or fourth embodiment. Further, the coil 40 of the present embodiment may include the first layer 43 described in the fifth embodiment section, instead of the first layer 41. The remainder of configuration, function and effects of the present embodiment are similar to those of any of the first to fifth embodiments.

Seventh Embodiment

Figure 20:
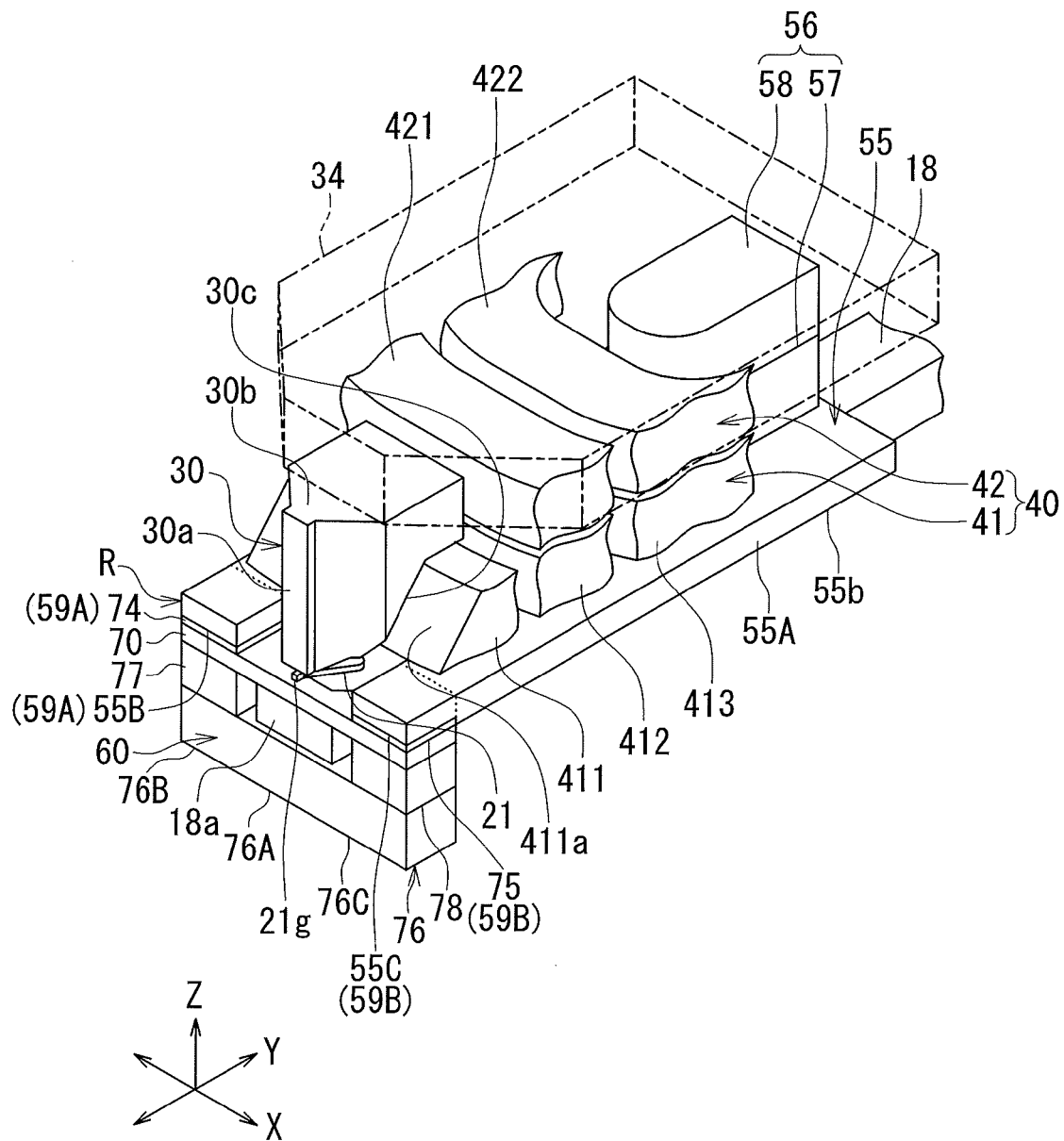
FIG. 20 is a perspective view showing the main part of a thermally-assisted magnetic recording head according to a seventh embodiment of the invention.
Figure 21:
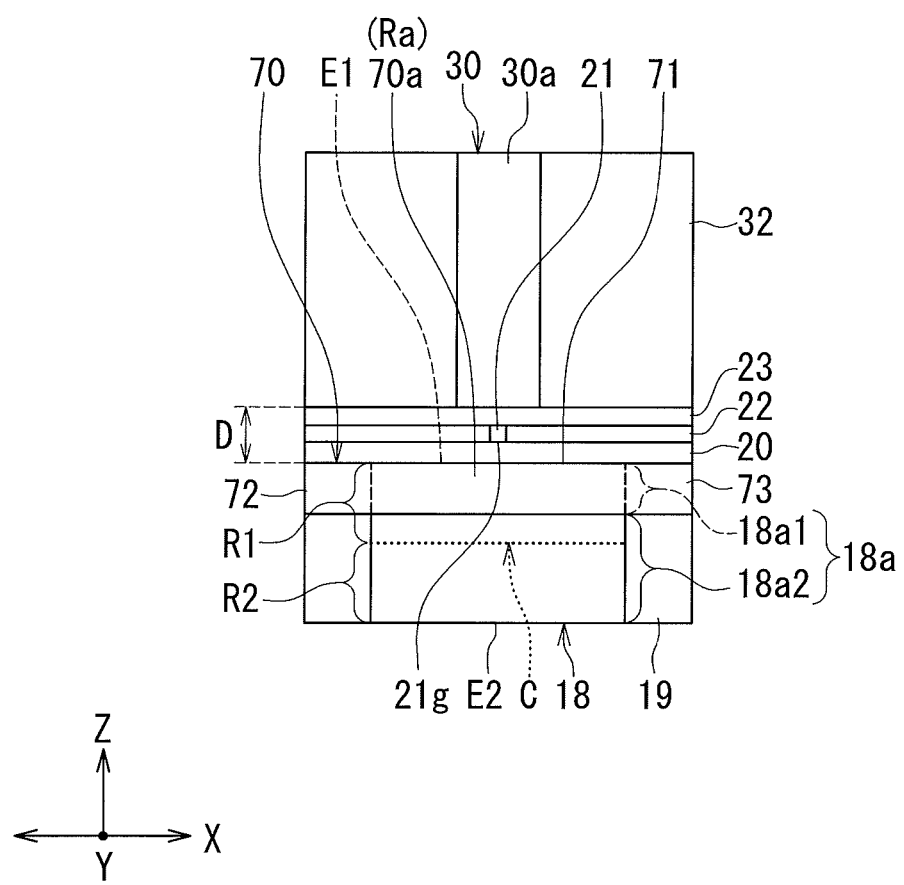
FIG. 21 is a front view showing the main part of the thermally-assisted magnetic recording head according to the seventh embodiment of the invention.
Figure 22:
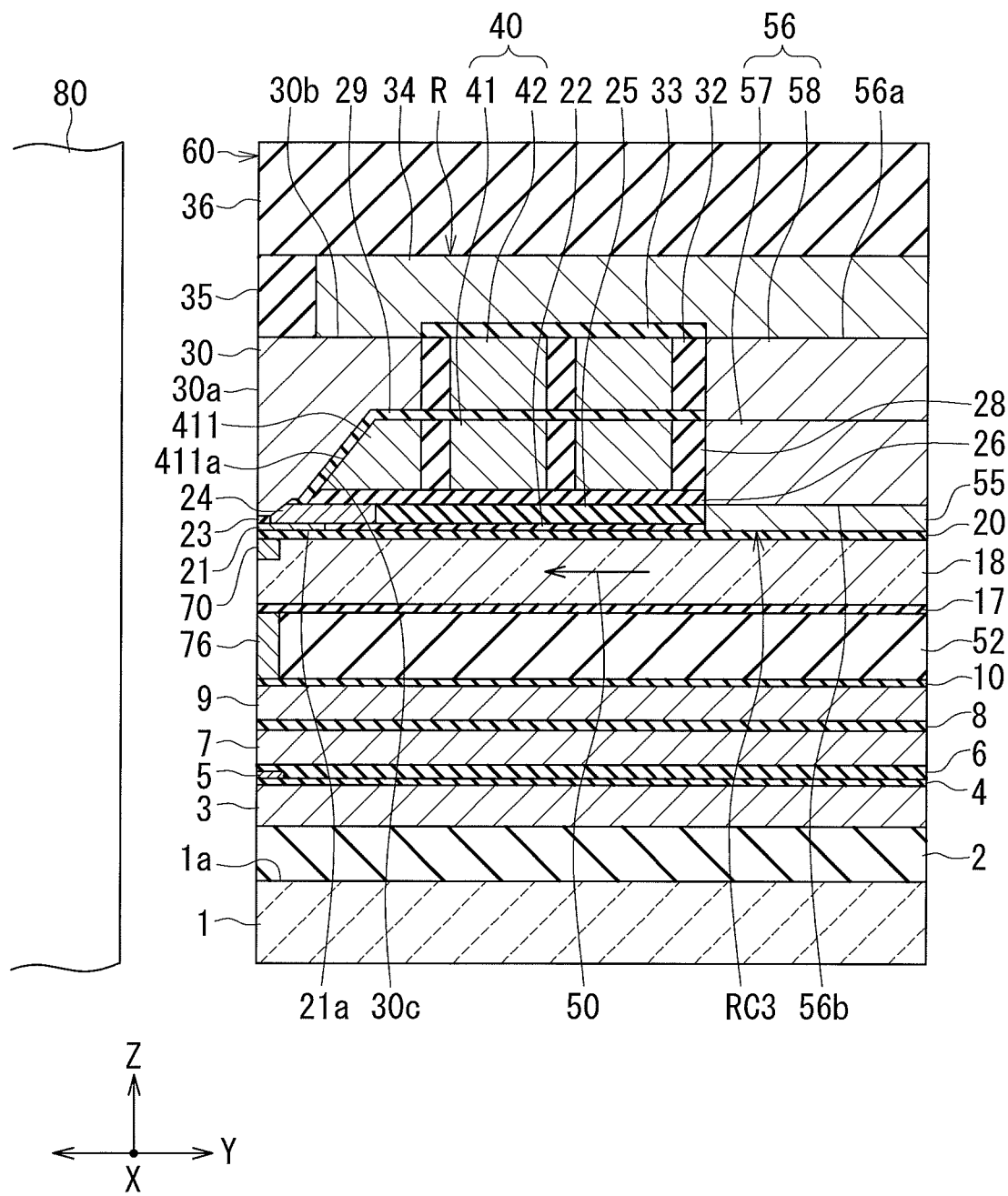
FIG. 22 is a cross-sectional view showing the configuration of the thermally-assisted magnetic recording head according to the seventh embodiment of the invention.
Figure 23:
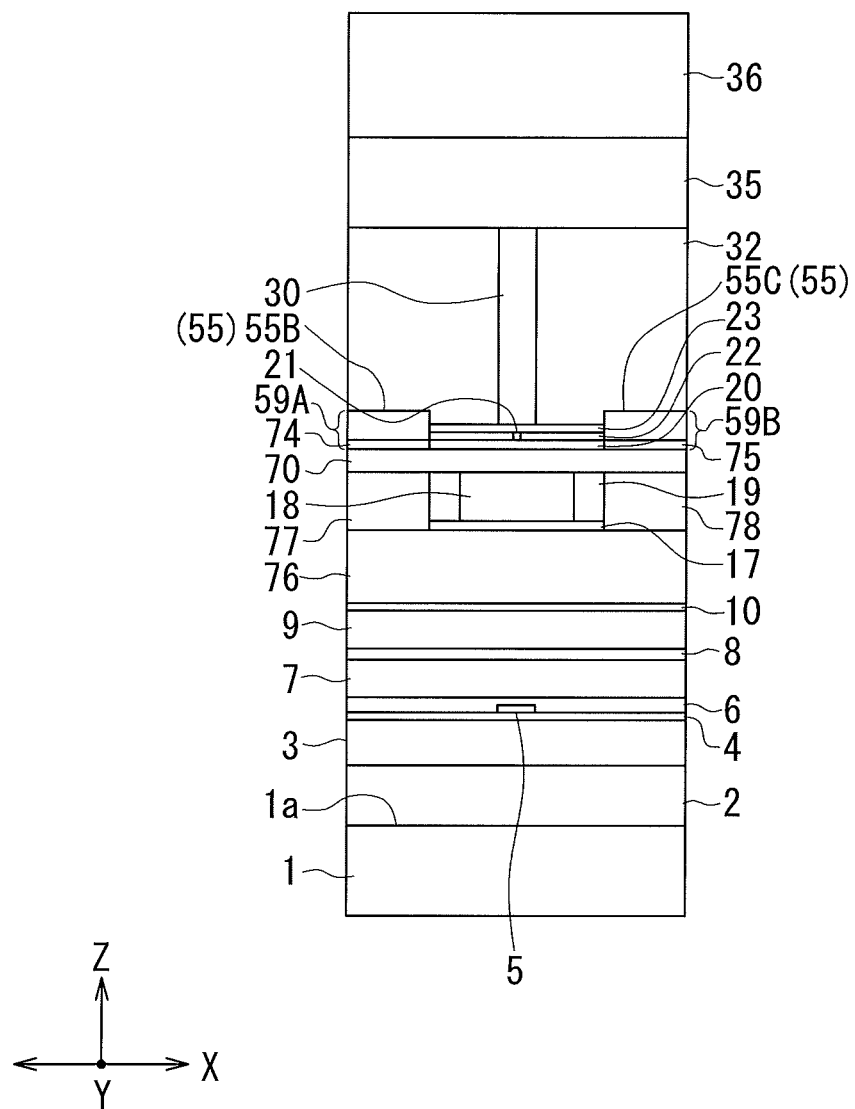
FIG. 23 is a front view showing the medium facing surface of the thermally-assisted magnetic recording head according to the seventh embodiment of the invention.
Figure 24:
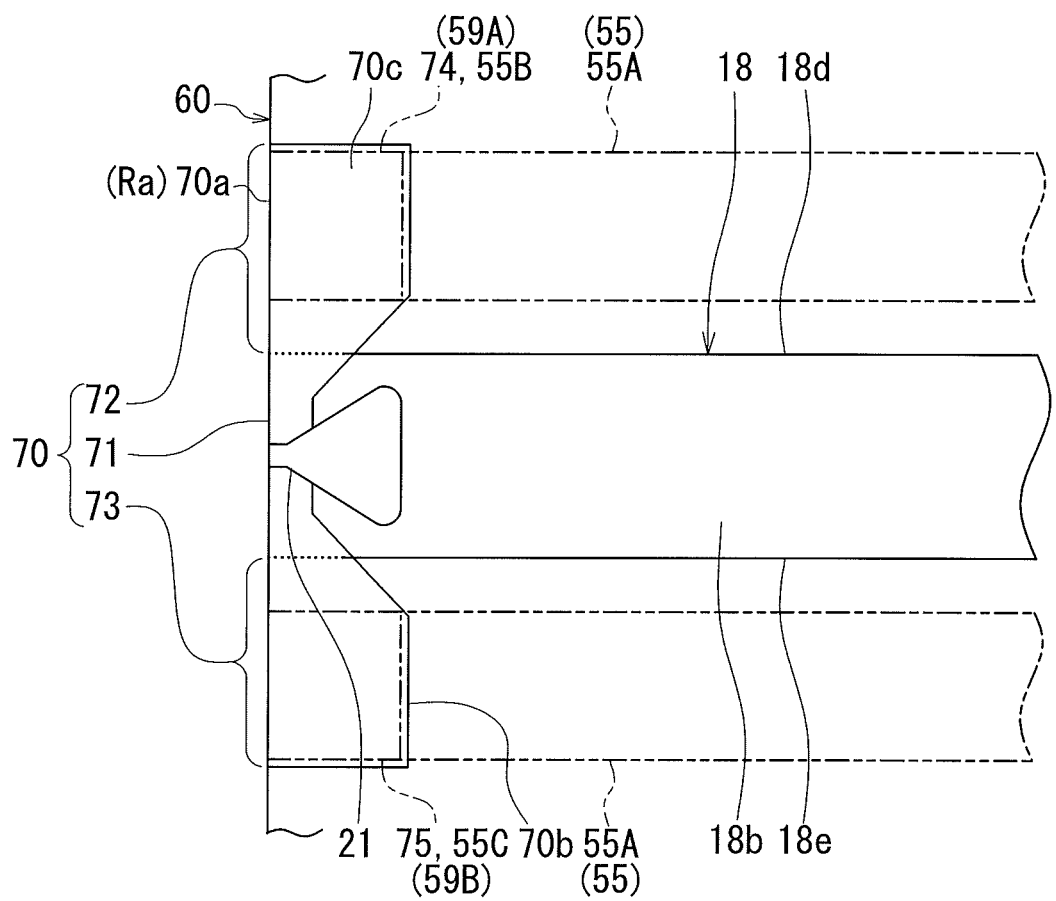
FIG. 24 is a plan view showing a part of the thermally-assisted magnetic recording head according to the seventh embodiment of the invention.

A thermally-assisted magnetic recording head according to a seventh embodiment of the invention will now be described with reference to FIG. 20 to FIG. 24. FIG. 20 is a perspective view showing the main part of the thermally-assisted magnetic recording head. FIG. 21 is a front view showing the main part of the thermally-assisted magnetic recording head. FIG. 22 is a cross-sectional view showing the configuration of the thermally-assisted magnetic recording head. FIG. 23 is a front view showing the medium facing surface of the thermally-assisted magnetic recording head. FIG. 24 is a plan view showing a part of the thermally-assisted magnetic recording head.

The configuration of the thermally-assisted magnetic recording head according to the present embodiment differs from the sixth embodiment in the following ways. In the thermally-assisted magnetic recording head according to the present embodiment, the return path section R includes a shield 70 instead of the shield 51. The shield 70 is located near the front end face 18a of the core 18. The shield 70 is formed of a magnetic metal material.

The shapes and locations of the shield 70 and the core 18 will now be described in detail with reference to FIG. 20, FIG. 21 and FIG. 24. The shield 70 has an end face 70a located in the medium facing surface 60, a rear end face 70b opposite to the end face 70a, a top surface 70c, and a bottom surface. In the present embodiment, in particular, the end face 70a of the shield 70 also serves as the second end face Ra of the return path section R. In other words, the shield 70 includes the second end face Ra. The shield 70 is shaped to be greater in dimension in the track width direction (the X direction) than in dimension in the direction perpendicular to the top surface 1a of the substrate 1 (the Z direction).

The second end face Ra of the return path section R, i.e., the end face 70a of the shield 70, is located on the rear side in the direction of travel of the recording medium 80 relative to the first end face 30a of the main pole 30. The near-field light generating part 21g of the plasmon generator 21 is located between the first end face 30a and the second end face Ra of the return path section R. As shown in FIG. 21, the distance between the first end face 30a and the second end face Ra is denoted by reference letter D. The distance D is preferably in the range of 50 to 300 nm and more preferably in the range of 50 to 100 nm.

As shown in FIG. 21, the front end face 18a of the core 18 includes a first portion 18a1 located away from the medium facing surface 60 and a second portion 18a2 located in the medium facing surface 60. The second portion 18a2 is located on the rear side in the direction of travel of the recording medium 80 relative to the first portion 18a1. Further, there is a difference in level between the first portion 18a1 and the second portion 18a2. Note that the entire front end face 18a may be located away from the medium facing surface 60.

As shown in FIG. 21, the front end face 18a has a first edge E1 lying at the front-side end of the front end face 18a in the direction of travel of the recording medium 80 (the Z direction), and a second edge E2 lying at the rear-side end of the front end face 18a in the direction of travel of the recording medium 80. The first edge E1 is located closer to the near-field light generating part 21g than is the second edge E2. The first edge E1 also serves as the front-side end of the first portion 18a1 in the direction of travel of the recording medium 80. The second edge E2 also serves as the rear-side end of the second portion 18a2 in the direction of travel of the recording medium 80.

In FIG. 21, the dotted line indicates the midpoint position between the first edge E1 and the second edge E2. This midpoint position will be denoted by reference letter C. Further, the front end face 18a is divided into two regions: a first region R1 extending from the midpoint position C to the first edge E1; and a second region R2 extending from the midpoint position C to the second edge E2. The first region R1 includes the first portion 18a1 and a part of the second portion 18a2. The second region R2 includes the remainder of the second portion 18a2.

The shield 70 overlaps only the first region R1 of the front end face 18a of the core 18 when viewed in the direction perpendicular to the medium facing surface 60 (the Y direction). The shield 70 particularly overlaps only the first portion 18a1 of the first region R1. A part of the rear end face 70b of the shield 70 is opposed to the first portion 18a1. The part of the rear end face 70b may or may not be in contact with the first portion 18a1. In the latter case, a part of the cladding may be interposed between the part of the rear end face 70b and the first portion 18a1.

The shield 70 includes an overlapping portion 71 which overlaps the first region R1 (the first portion 18a1) when viewed in the direction perpendicular to the medium facing surface 60, and further includes a first non-overlapping portion 72 and a second non-overlapping portion 73 located on opposite sides of the overlapping portion 71 in the track width direction (the X direction). In FIG. 24, the boundaries between the overlapping portion 71 and the first and second non-overlapping portions 72 and 73 are indicated in dotted lines. The length of the overlapping portion 71 in the direction perpendicular to the medium facing surface 60 is constant regardless of position in the track width direction.

The first and second non-overlapping portions 72 and 73 are located on opposite sides of the front end face 18a of the core 18 in the track width direction when viewed in the direction perpendicular to the medium facing surface 60. Thus, the first and second non-overlapping portions 72 and 73 do not overlap the front end face 18a. The maximum length of each of the first and second non-overlapping portions 72 and 73 in the direction perpendicular to the medium facing surface 60 is greater than the length of the overlapping portion 71 in that direction.

The top surface 70c of the shield 70 and the evanescent light generating surface 18b of the core 18 are coplanar. Alternatively, the top surface 70c and the evanescent light generating surface 18b may be located at different levels in the direction of travel of the recording medium 80 (the Z direction). The plasmon exciting part 21a of the plasmon generator 21 is located at a predetermined distance from each of the top surface 70c and the evanescent light generating surface 18b, and faces the top surface 70c and the evanescent light generating surface 18b. A part of the cladding layer 20 is interposed between the plasmon exciting part 21a and each of the top surface 70c and the evanescent light generating surface 18b.

The thermally-assisted magnetic recording head according to the present embodiment includes magnetic layers 74 and 75 each formed of a magnetic material, in place of the magnetic layers 53 and 54 of the sixth embodiment. The magnetic layers 74 and 75 are located in the vicinity of the medium facing surface 60 at positions on opposite sides of the plasmon generator 21 in the track width direction, and are embedded in the cladding layer 20. Each of the magnetic layers 74 and 75 has a front end face located in the medium facing surface 60, a top surface, and a bottom surface. The bottom surface of the magnetic layer 74 is in contact with a portion of the top surface 70c of the shield 70 that is included in the first non-overlapping portion 72. The bottom surface of the magnetic layer 75 is in contact with a portion of the top surface 70c of the shield 70 that is included in the second non-overlapping portion 73.

The top surface of the magnetic layer 74 is in contact with a portion of the bottom surface 55b of the magnetic layer 55 that is included in the coupling portion 55B. The top surface of the magnetic layer 75 is in contact with a portion of the bottom surface 55b of the magnetic layer 55 that is included in the coupling portion 55C.

The return path section R of the present embodiment includes the shield 70, the first yoke portion 34, and a connecting part RC3 connecting the shield 70 and the first yoke portion 34 to each other. The connecting part RC3 includes a second yoke portion 55A, a first columnar portion 56, a second columnar portion 59A, and a third columnar portion 59B. In the present embodiment, the second columnar portion 59A is constituted by the magnetic layer 74 and the coupling portion 55B of the magnetic layer 55. The third columnar portion 59B is constituted by the magnetic layer 75 and the coupling portion 55C of the magnetic layer 55.

As shown in FIG. 20, FIG. 23 and FIG. 24, the second columnar portion 59A and the third columnar portion 59B are located on opposite sides of the plasmon generator 21 in the track width direction and connected to the shield 70. The second yoke portion 55A is connected to the second end 56b of the first columnar portion 56, and connected to the shield 70 via the second and third columnar portions 59A and 59B.

The second columnar portion 59A of the connecting part RC3 is connected to the first non-overlapping portion 72. More specifically, the bottom surface of the magnetic layer 74, which is part of the second columnar portion 59A, is in contact with a portion of the top surface 70c of the shield 70 that is included in the first non-overlapping portion 72. The third columnar portion 59B of the connecting part RC3 is connected to the second non-overlapping portion 73. More specifically, the bottom surface of the magnetic layer 75, which is part of the third columnar portion 59B, is in contact with a portion of the top surface 70c of the shield 70 that is included in the second non-overlapping portion 73.

The thermally-assisted magnetic recording head according to the present embodiment further includes a sub-shield 76, a fourth columnar portion 77, and a fifth columnar portion 78 each formed of a magnetic material. The sub-shield 76 is shaped and located in the same manner as the shield 51 of the sixth embodiment. More specifically, the sub-shield 76 is disposed on the nonmagnetic layer 10 and has a front end face located in the medium facing surface 60, a rear end face opposite to the front end face, and a top surface. In addition, the sub-shield 76 includes a central portion 76A, and further includes a first side portion 76B and a second side portion 76C located on opposite sides of the central portion 76A in the track width direction (the X direction). The length of the central portion 76A in the direction perpendicular to the medium facing surface 60 is constant regardless of position in the track width direction. The maximum length of each of the side portions 76B and 76C in the direction perpendicular to the medium facing surface 60 is greater than the length of the central portion 76A in that direction.

The fourth and fifth columnar portions 77 and 78 are located in the vicinity of the medium facing surface 60 at positions on opposite sides of the core 18 in the track width direction. The fourth and fifth columnar portions 77 and 78 penetrate the cladding layers 17 and 19, and connect the shield 70 and the sub-shield 76 to each other. Each of the fourth and fifth columnar portions 77 and 78 has a front end face located in the medium facing surface 60, a top surface, and a bottom surface. The top surface of the fourth columnar portion 77 is in contact with a portion of the bottom surface of the shield 70 that is included in the first non-overlapping portion 72. The bottom surface of the fourth columnar portion 77 is in contact with a portion of the top surface of the sub-shield 76 that is included in the first side portion 76B. The top surface of the fifth columnar portion 78 is in contact with a portion of the bottom surface of the shield 70 that is included in the second non-overlapping portion 73. The bottom surface of the fifth columnar portion 78 is in contact with a portion of the top surface of the sub-shield 76 that is included in the second side portion 76C.

The sub-shield 76, the fourth columnar portion 77 and the fifth columnar portion 78 are not essential components of the thermally-assisted magnetic recording head, and can be dispensed with.

The specific functions and effects of the thermally-assisted magnetic recording head according to the present embodiment will now be described. The shield 70 has the same functions as those of the shield 51 described in the sixth embodiment section. Specifically, the shield 70 has the functions of: capturing a disturbance magnetic field applied to the thermally-assisted magnetic recording head from the outside thereof; capturing a magnetic flux that is produced from the first end face 30a of the main pole 30 and spreads in directions other than the direction perpendicular to the plane of the recording medium 80, and thereby preventing the magnetic flux from reaching the recording medium 80; and allowing a magnetic flux that has been produced from the first end face 30a of the main pole 30 and has magnetized a portion of the recording medium 80 to flow back to the main pole 30.

In the present embodiment, when viewed in the direction perpendicular to the medium facing surface 60, the shield 70 overlaps only the first region R1 of the front end face 18a of the core 18, the first region R1 being located closer to the main pole 30 than the other region of the front end face 18a. The present embodiment thus allows the first end face 30a of the main pole 30 and the second end face Ra of the return path section R or the end face 70a of the shield 70 to be located closer to each other than in the sixth embodiment. More specifically, the present embodiment allows the first end face 30a and the second end face Ra to be in close proximity to each other easily so that the distance D falls within the range of 50 to 300 nm. Consequently, the present embodiment allows the above-described functions of shield 70 to be effectively exerted to increase the write field intensity gradient. The lower limit of the distance D (50 nm) is a distance necessary to place the near-field light generating part 21g between the first end face 30a and the second end face Ra. To increase the write field intensity gradient, the distance D should be as small as possible. In view of the foregoing, the distance D is preferably in the range of 50 to 300 nm and more preferably in the range of 50 to 100 nm.

In the present embodiment, the near-field light generating part 21g of the plasmon generator 21 is located in the medium facing surface 60 and lies between the first end face 30a and the second end face Ra. This allows for producing a write magnetic field of a large write field intensity gradient in the vicinity of the near-field light generating part 21g. Consequently, the present embodiment allows for an increase in linear recording density.

If the shield 70 and the front end face 18a of the core 18 are opposed to each other over a large area, the light 50 propagating through the core 18 may pass through the front end face 18a and enter the shield 70, thereby causing the shield 70 to be heated and expand. This will result in the problem that the shield 70 will protrude toward the recording medium 80 and thus readily collide with the recording medium 80. In order to avoid this problem, the distance between the medium facing surface 60 and the recording medium 80 could be increased. However, this would lead to deterioration in write characteristics such as the overwrite property or to an increase in error rate. In contrast to this, the present embodiment is configured so that the shield 70 overlaps only the first region R1 of the front end face 18a when viewed in the direction perpendicular to the medium facing surface 60. More specifically, the shield 70 is not present between at least the second region R2 of the front end face 18a and the medium facing surface 60. The present embodiment thus prevents the shield 70 and the front end face 18a of the core 18 from being opposed to each other over a large area, thereby precluding the aforementioned problem.

To preclude the aforementioned problem with higher reliability, the region of the front end face 18a that the shield 70 overlaps when viewed in the direction perpendicular to the medium facing surface 60 may be only a region extending from a position that is located closer to the first edge E1 (not coinciding with the first edge E1) than is the midpoint position C to the first edge E1.

Further, in the present embodiment, the shield 70 is shaped to be greater in dimension in the track width direction (the X direction) than in dimension in the direction perpendicular to the top surface 1a of the substrate 1 (the Z direction). Consequently, even though the shield 70 overlaps only the first region R1 of the front end face 18a, it is possible to connect the second and third columnar portions 59A and 59B to two portions of the shield 70 that are opposite in the track width direction.

In the present embodiment, the shield 70 formed of a magnetic metal material is provided on the leading side of the plasmon generator 21, particularly in the vicinity of the near-field light generating part 21g. Since the top surface 70c of the shield 70 is located close to the plasmon exciting part 21a of the plasmon generator 21, surface plasmons are excited also on the top surface 70c. Then, the electric line of force produced by the surface plasmons on the plasmon exciting part 21a and the electric line of force produced by the surface plasmons on the top surface 70c of the shield 70 are coupled to each other in the vicinity of the near-field light generating part 21g. This produces a high-density electric line of force in a narrow area in the vicinity of the near-field light generating part 21g. The spread of the near-field light generated by the near-field light generating part 21g is thereby suppressed. Thus, the shield 70 of the present embodiment has also the function of suppressing the spread of near-field light. By virtue of this function, the present embodiment allows for a reduction in track width to achieve an increase in recording density.

Further, in the present embodiment, the maximum length of each of the first and second non-overlapping portions 72 and 73 of the shield 70 in the direction perpendicular to the medium facing surface 60 is greater than the length of the overlapping portion 71 of the shield 70 in that direction. This feature of the present embodiment makes it possible to enhance the aforementioned function of the shield 70 while preventing magnetic flux from being saturated at some midpoint in the shield 70.

Further, in the present embodiment, the sub-shield 76 has the functions of: capturing a disturbance magnetic field applied to the thermally-assisted magnetic recording head from the outside thereof; capturing a magnetic flux that is produced from the first end face 30a of the main pole 30 and spreads in directions other than the direction perpendicular to the plane of the recording medium 80, and thereby preventing the magnetic flux from reaching the recording medium 80; and allowing a magnetic flux that has been produced from the first end face 30a of the main pole 30 and has magnetized a portion of the recording medium 80 to flow back to the main pole 30, as does the shield 70. Further, the sub-shield 76, the fourth columnar portion 77 and the fifth columnar portion 78 have the function of preventing magnetic flux from being saturated in the shield 70. The present embodiment thus makes it possible to enhance the aforementioned function of the shield 70 further.

The remainder of configuration, function and effects of the present embodiment are similar to those of the sixth embodiment.

The present invention is not limited to the foregoing embodiments, and various modifications may be made thereto. For example, as far as the requirements of the appended claims are met, the shape and location of the main pole, and the number, shape and location of the specific coil element are not limited to the respective examples illustrated in the foregoing embodiments but can be chosen as desired.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A thermally-assisted magnetic recording head comprising:
 a medium facing surface configured to face a recording medium;
 a coil configured to produce a magnetic field corresponding to data to be written on the recording medium;
 a main pole having a first end face located in the medium facing surface, the main pole being configured to allow a magnetic flux corresponding to the magnetic field produced by the coil to pass, and configured to produce a write magnetic field for writing the data on the recording medium;
 a return path section formed of a magnetic material and having a second end face located in the medium facing surface, the return path section being connected to the main pole and configured to allow a magnetic flux corresponding to the magnetic field produced by the coil to pass;
 a waveguide including: a core which has a front end face facing toward the medium facing surface and is configured to allow light to propagate therethrough; and a cladding provided around the core; and
 a plasmon generator including a near-field light generating part located in the medium facing surface, wherein
 the second end face is located on a rear side in a direction of travel of the recording medium relative to the first end face,
 the near-field light generating part is located between the first end face and the second end face,
 the main pole is located on a front side in the direction of travel of the recording medium relative to the core,
 the plasmon generator is configured so that a surface plasmon is excited on the plasmon generator based on the light propagating through the core, and the near-field light generating part generates near-field light based on the surface plasmon,
 the main pole further has a top surface which is a surface lying at a front-side end of the main pole in the direction of travel of the recording medium,
 the return path section includes a first yoke portion located on the front side in the direction of travel of the recording medium relative to the main pole and in contact with the top surface of the main pole,
 the coil includes a plurality of coil elements extending to pass between the core and the first yoke portion,
 the plurality of coil elements include a specific coil element,
 in a cross section that intersects the first end face of the main pole and is perpendicular to the medium facing surface and parallel to the direction of travel of the recording medium, the specific coil element has a bottom end portion lying at a rear-side end of the specific coil element in the direction of travel of the recording medium, a top end portion lying at a front-side end of the specific coil element in the direction of travel of the recording medium, a front end portion closest to the medium facing surface, and a rear end portion farthest from the medium facing surface, and
 the main pole includes: a first portion lying between a first imaginary plane and a second imaginary plane which are perpendicular to the direction of travel of the recording medium, the first portion being closer to the medium facing surface than is the specific coil element; and a second portion lying between a third imaginary plane and a fourth imaginary plane which are parallel to the medium facing surface, the second portion being located on the front side in the direction of travel of the recording medium relative to the specific coil element, the first imaginary plane passing through the bottom end portion of the specific coil element, the second imaginary plane passing through the top end portion of the specific coil element, the third imaginary plane passing through the front end portion of the specific coil element, the fourth imaginary plane passing through the rear end portion of the specific coil element.

2. The thermally-assisted magnetic recording head according to claim 1, wherein
the core has an evanescent light generating surface configured to generate evanescent light based on the light propagating through the core,
the plasmon generator includes a plasmon exciting part located at a predetermined distance from the evanescent light generating surface and facing the evanescent light generating surface, and
the plasmon generator is configured so that a surface plasmon is excited on the plasmon exciting part through coupling with the evanescent light generated by the evanescent light generating surface, the surface plasmon propagates to the near-field light generating part, and the near-field light generating part generates near-field light based on the surface plasmon.

3. The thermally-assisted magnetic recording head according to claim 1, wherein the first and second portions of the main pole are formed of a single layer.

4. The thermally-assisted magnetic recording head according to claim 1, wherein
the specific coil element has a first inclined surface facing toward the medium facing surface, and a distance from the medium facing surface to an arbitrary point on the first inclined surface decreases with decreasing distance from the arbitrary point to the first imaginary plane, and
the main pole has a second inclined surface opposed to the first inclined surface.

5. The thermally-assisted magnetic recording head according to claim 1, wherein the front end face of the core is located between the first end face and the second end face in the direction of travel of the recording medium.

6. The thermally-assisted magnetic recording head according to claim 1, wherein the return path section further includes a shield including the second end face, and a connecting part connecting the shield and the first yoke portion to each other.

7. The thermally-assisted magnetic recording head according to claim 6, wherein
the connecting part includes a second yoke portion, a first columnar portion, a second columnar portion, and a third columnar portion,
the second yoke portion and the first columnar portion are located on the front side in the direction of travel of the recording medium relative to the core,
the first columnar portion is located away from the medium facing surface and has a first end and a second end opposite to each other in the direction of travel of the recording medium,
the second and third columnar portions are located closer to the medium facing surface than is the first columnar portion,
the first yoke portion connects the main pole to the first end of the first columnar portion,
the second columnar portion and the third columnar portion are located on opposite sides of the plasmon generator in a track width direction and connected to the shield,
the second yoke portion is connected to the second end of the first columnar portion, and connected to the shield via the second and third columnar portions, and
the coil is wound around the first columnar portion.

8. The thermally-assisted magnetic recording head according to claim 6, wherein
the front end face of the core has a first edge lying at a front-side end of the front end face in the direction of travel of the recording medium, and a second edge lying at a rear-side end of the front end face in the direction of travel of the recording medium,
the first edge is located closer to the near-field light generating part than is the second edge, and
when the front end face of the core is divided into two regions: a first region extending from a midpoint position between the first edge and the second edge to the first edge; and a second region extending from the midpoint position to the second edge, the shield overlaps only the first region of the front end face when viewed in a direction perpendicular to the medium facing surface.

9. The thermally-assisted magnetic recording head according to claim 8, wherein
the shield includes at least one non-overlapping portion located on an outward side of the front end face of the core in the track width direction when viewed in the direction perpendicular to the medium facing surface, and
the connecting part is connected to the at least one non-overlapping portion.

10. The thermally-assisted magnetic recording head according to claim 9, wherein the at least one non-overlapping portion is two non-overlapping portions that are located on opposite sides of the front end face of the core in the track width direction when viewed in the direction perpendicular to the medium facing surface.

11. The thermally-assisted magnetic recording head according to claim 8, wherein the first end face and the second end face are at a distance of 50 to 300 nm from each other.

* * * * *